United States Patent [19]

Martin et al.

[11] Patent Number: 4,902,217
[45] Date of Patent: Feb. 20, 1990

[54] ROTARY BLOW MOLDING MACHINE WITH ROTARY TAKE-OUT MECHANISM HAVING EXPANDIBLE TAKE-OUT PIN

[75] Inventors: M. Warren Martin, Saline; Lawrence H. Weber, Ypsilanti, both of Mich.

[73] Assignee: R & B Machine Tool Company, Saline, Mich.

[21] Appl. No.: 252,805

[22] Filed: Oct. 3, 1988

[51] Int. Cl.$^4$ ............................................. B29C 49/70
[52] U.S. Cl. ................................. 425/537; 264/543; 425/444; 425/540
[58] Field of Search ............... 425/540, 537, 535, 529, 425/527, 531, 536, DIG. 5, 444; 264/538, 543

[56] References Cited

U.S. PATENT DOCUMENTS

| | | | |
|---|---|---|---|
| 3,550,200 | 12/1970 | Gilbert | 425/529 |
| 3,764,250 | 10/1973 | Waterloo | 425/528 |
| 3,778,213 | 12/1973 | DiSettembrini | 425/537 X |
| 3,881,855 | 5/1975 | Farkas | 425/540 X |
| 3,891,371 | 6/1975 | Sokolow | 425/535 X |
| 4,047,873 | 9/1977 | Farrell | 425/523 |
| 4,187,065 | 2/1980 | Perez | 425/136 |
| 4,213,750 | 7/1980 | Kubota et al. | 425/531 |
| 4,233,010 | 11/1980 | Suzuki | 425/540 X |
| 4,248,582 | 2/1981 | Martin, Jr. | 425/531 |
| 4,279,587 | 7/1981 | Martin, Jr. | 425/531 |
| 4,403,940 | 9/1983 | Krishnamumar et al. | 425/535 X |
| 4,439,127 | 3/1984 | Frohn | 425/155 |
| 4,505,664 | 3/1985 | Craig | 425/525 |
| 4,549,865 | 10/1985 | Myers | 425/342.1 |
| 4,589,838 | 5/1986 | Ziegler | 425/540 |
| 4,752,206 | 6/1988 | Nowicki et al. | 425/540 X |

Primary Examiner—Richard L. Chiesa
Attorney, Agent, or Firm—Reising, Ethington, Barnard, Perry & Milton

[57] ABSTRACT

The blow molding machine includes a rotary carousel having a plurality of mold stations thereon with each mold station including a pair of openable and closeable mold sections. A rotary take-out mechanism removes a blown article from each pair of mold sections as they pass the take-out mechanism. In particular, the take-out mechanism includes a take-out member inserted into the blown article to grip same while the mold sections are closed. The take-out member is carried on a turret arm rotated in oscillatory manner about the axis of revolution of the carousel and in synchronism therewith to cause the inserted take-out member to follow rotation of the mold sections as they are opened. When the mold sections are sufficiently opened, the take-out member is rotated about another axis so as to remove the blown article from between the opened mold sections. The take-out member is carried on a spindle that is rotatably indexable on the turret arm about the other axis. A rack and pinion mechanism operatively associated with the spindle is actuated by oscillatory movement of the turret arm to rotatably index the spindle and the take-out member thereon at the proper times.

46 Claims, 14 Drawing Sheets

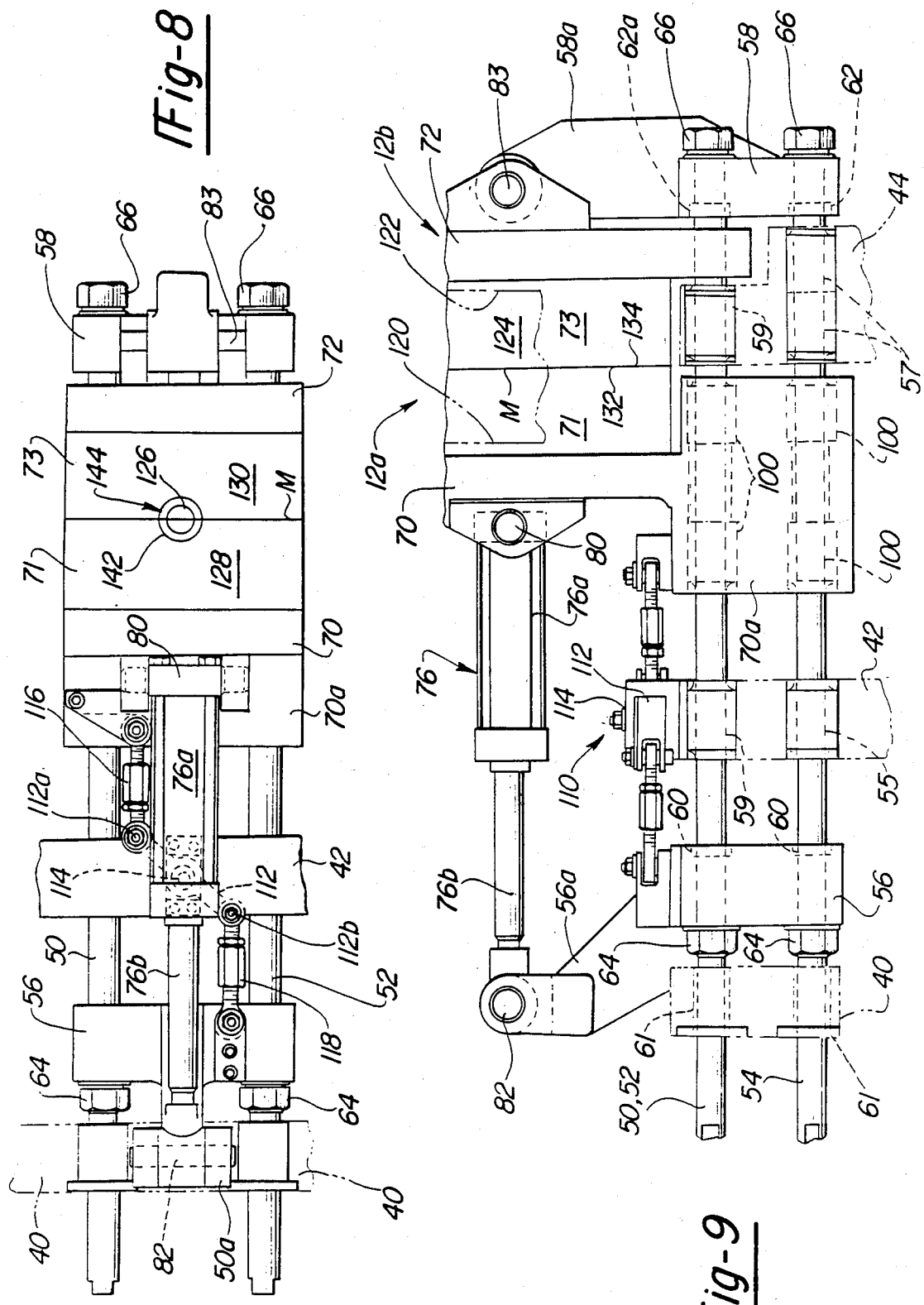

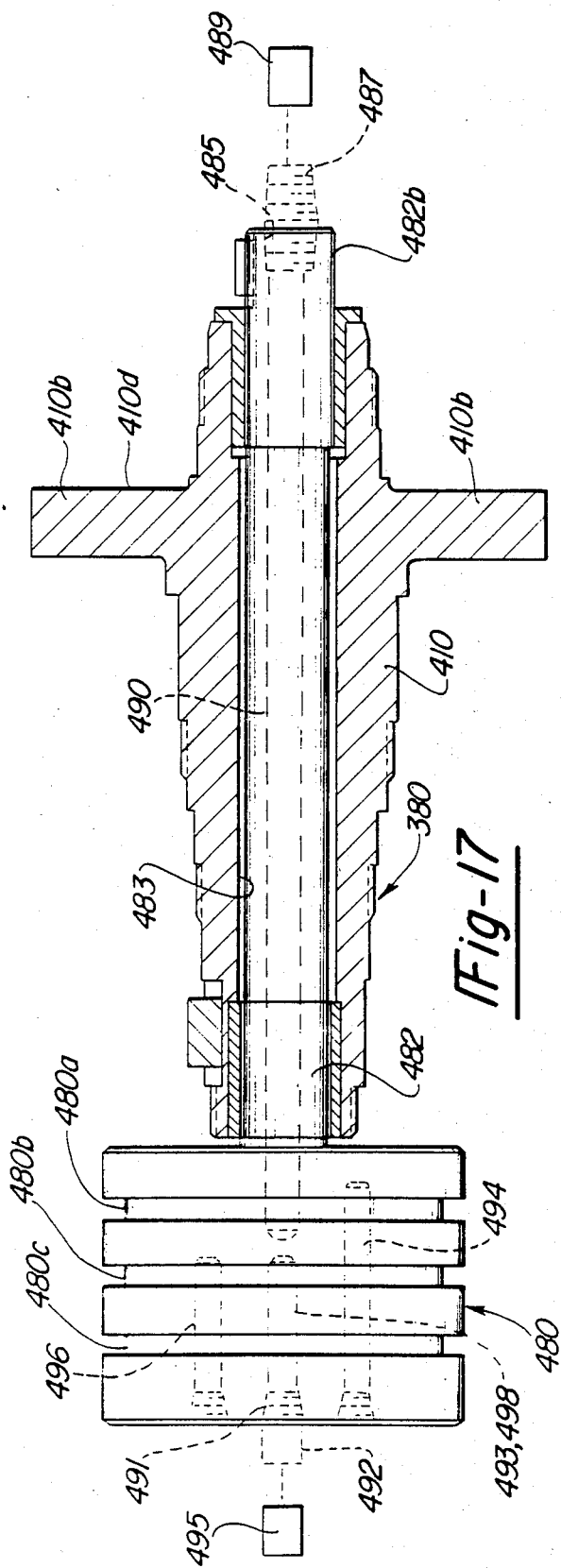
Fig-17
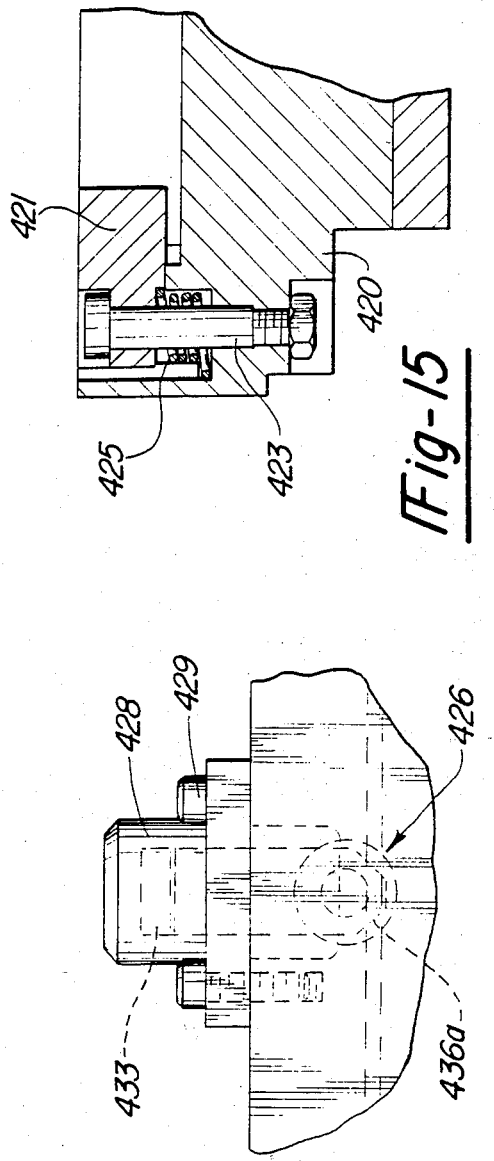
Fig-15
Fig-16

ROTARY BLOW MOLDING MACHINE WITH ROTARY TAKE-OUT MECHANISM HAVING EXPANDIBLE TAKE-OUT PIN

FIELD OF THE INVENTION

The invention relates generally to blow molding machines and, in particular, to a rotary carousel blow molding machine having a rotary take-out mechanism for removing a blown article from a mold station on the carousel as it is rotatably indexed.

BACKGROUND OF THE INVENTION

Rotary carousel blow molding machines are known in the art as exemplified in the Waterloo U.S. Pat. No. 3,764,250 issued Oct. 9, 1973; the Craig U.S. Pat. No. 4,505,664 issued Mar. 19, 1985; the Frohn U.S. Pat. No. 4,439,127 issued Mar. 27, 1984 and the Myers U.S. Pat. No. 4,549,865 issued Oct. 29, 1985.

In the past, the blown article has been removed from a mold station on the rotary carousel by various means. For example, in the Waterloo patent referred to above, a blown container falls by gravity from a mold station when the mold halves are opened at an unloading position corresponding to the lowest path of travel of the mold station. In the aforementioned Craig patent, a wheeled cart removes the blown article from opened mold halves. The aforementioned Myers patent employs an ejector mechanism operative to remove a blown container.

The Kubota et al U.S. Pat. No. 4,213,750 issued July 22, 1980, describes a horizontal rotary carousel blow molding machine that includes a rotary eject turret to remove a blown container from opened molds. The rotary eject turret is rotated in synchronism with the carousel to pass between the mold halves when they are opened at an unloading station. The eject turret includes suction holes to hold a side of the blown container by vacuum action after the blown container is ejected from one of the mold halves by an ejector or knock-out pin. The eject turret carries the blown article to an upper conveyor as the turret is rotatably indexed.

SUMMARY OF THE INVENTION

The invention contemplates a blow molding machine having a carousel rotatably supported on a base, means for rotating the carousel, a plurality of pairs of openable and closeable mold sections on the carousel so as to be radially disposed and circumferentially spaced apart thereon and a rotary take-out mechanism operable to remove a blown article from a respective pair of mold sections passing thereby. The take-out mechanism includes a take-out member adapted to grip the blown article when the mold sections are closed and to be rotated with the mold sections about the axis of revolution of the carousel so as to track the movement of the mold sections as they are opened. When the mold sections are opened, the take-out member gripping the blown article is rotated about another axis of revolution to remove the blown article from between the opened mold sections.

In one embodiment of the invention, the take-out mechanism includes a turret arm rotatable about the axis of revolution of the carousel, a spindle disposed on the turret arm for rotation about a spindle axis and including a plurality of circumferentially spaced take-out members or arms, means for rotating the spindle to align a respective take-out member to grip the blown article between a pair of closed mold sections indexably positioned at a gripping station and means for rotating the turret arm about the axis of revolution of the carousel to cause the take-out member gripping the blown article to track or follow rotation of the closed mold sections as they rotate past the gripping station and are opened to free the blown article for removal therefrom by rotation of the spindle about its own axis.

In a preferred embodiment of the invention, the turret arm is oscillated about the axis of revolution of the carousel by an oscillation mechanism driven in synchronism with the carousel. The limited angular oscillation of the turret arm is sufficient to allow the take-out member gripping the blown article to track the movement of the mold sections as they are opened upon further indexing of the carousel. The turret arm then is returned by the oscillation mechanism to its original angular position at the gripping station.

In another preferred embodiment of the invention, the spindle is rotatably indexed on the turret arm by a rack and pinion mechanism wherein oscillation of the turret arm causes the pinion and rack to relatively traverse to index the spindle in synchronism with the rotary indexing of the mold stations on the carousel. Typically, the spindle is rotatably indexed at the top of the oscillatory stroke of the turret arm where the mold sections are fully open.

In still another preferred embodiment of the invention, each take-out member on the spindle is movable radially toward and into a blown article of each mold station successively positioned opposite each take-out member at the gripping station so as to grip the blown article from the inside thereof. Preferably, each take-out member is moved to grip the blown article from the inside by inserting an expandible take-out pin into an open end of the blown article, such as the neck of blown container, accessible through an open mouth defined by the closed mold sections, and expanding the pin after insertion. Air spool means is provided on the turret arm to expand the take-out pin after it is inserted in the blown article so as to grip the article from the inside while the article remains captured between the closed mold sections and to permit contraction of the take-out pin to release the blown container after removal of the article from between the subsequently opened mold sections.

The invention also contemplates an expandible/contractible take-out pin for use in the take-out mechanism wherein the take-out pin includes a resilient axial sleeve and a fluid piston movable in one axial direction to engage and expand the sleeve in a transverse direction so as to grip the blown article and movable in an opposite axial direction out of engagement to allow self contraction of the resilient sleeve to its original lesser transverse dimension to release the blown article from the pin.

The invention also contemplates a method for removing a blown article from a mold station on a rotary carousel.

BRIEF DESCRIPTION OF THE DRAWINGS

FIG. 8 is a plan view of a mold station.

FIG. 9 is a side elevational view of the mold station of FIG. 8.

FIG. 15 is a sectional view taken along lines 15—15 of FIG. 12.

FIG. 16 is a sectional view taken along lines 16—16 of FIG. 12.

FIG. 17 is a partial sectional view of the spindle shaft with the spool valve and spool shaft shown in elevation.

BEST MODE FOR PRACTICING THE INVENTION

Figure 1:
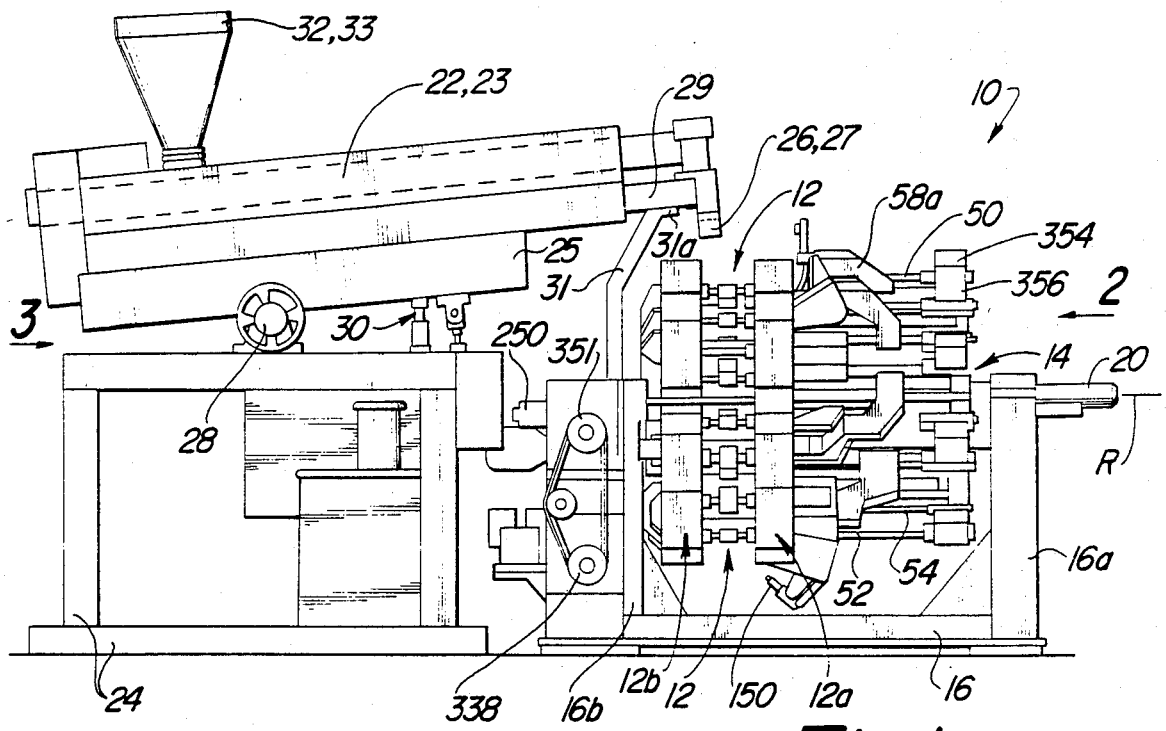
FIG. 1 is a side elevational view of a blow molding machine in accordance with the invention.

Referring initially to FIGS. 1-6, the blow molding machine 10 of the invention includes a plurality of radially disposed, circumferentially spaced mold stations 12 disposed on a rotary carousel 14. The rotary carousel 14 is rotatably supported on a machine base 16 by a carousel shaft 20. The rotary carousel 14 rotates on the base 16 about a horizontal axis R defined by the horizontal carousel shaft 20.

A pair of screw type thermoplastic material extruders 22,23 are disposed side-by-side on another base 24 such that the extruders feed thermoplastic material to an extruder head 26 that overlies the rotary carousel 14. The rotary carousel 14 is incrementally indexed to rotate the mold stations 12 relative to the extruder head 26. The extruders 22,23 are mounted on a platform 25 that is pivotally mounted on the base 24 by pivot shaft 28 so that the extruder head 26 can be rocked about the pivot shaft 28 by a cylinder/piston assembly 30 as will be explained in detail hereinbelow. An upstanding support 31 extends from the base 16 and includes a platform 31a on which a photoelectric or other eye (not shown) is disposed to determine when a parison T is initially extruded from head 26. When the eye senses the presence of the parison T, a signal is sent to start operation of the machine 10 as will be described below. Hoppers 32,33 provide granular thermoplastic material to conventional screw type extruders 22,23.

Figure 3:
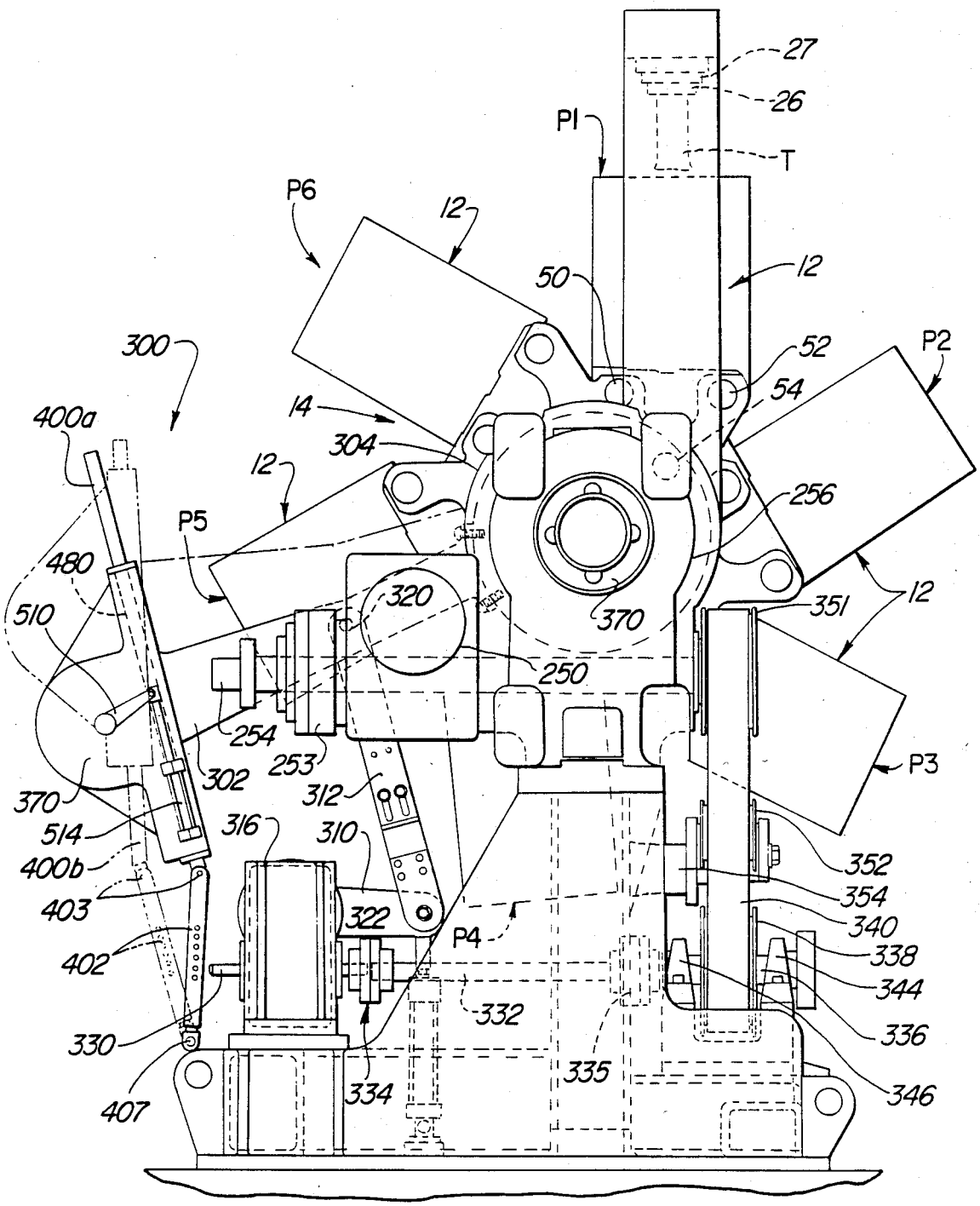
FIG. 3 is an end elevational view of the blow molding machine in the direction of arrow 3 of FIG. 1.
Figure 4:
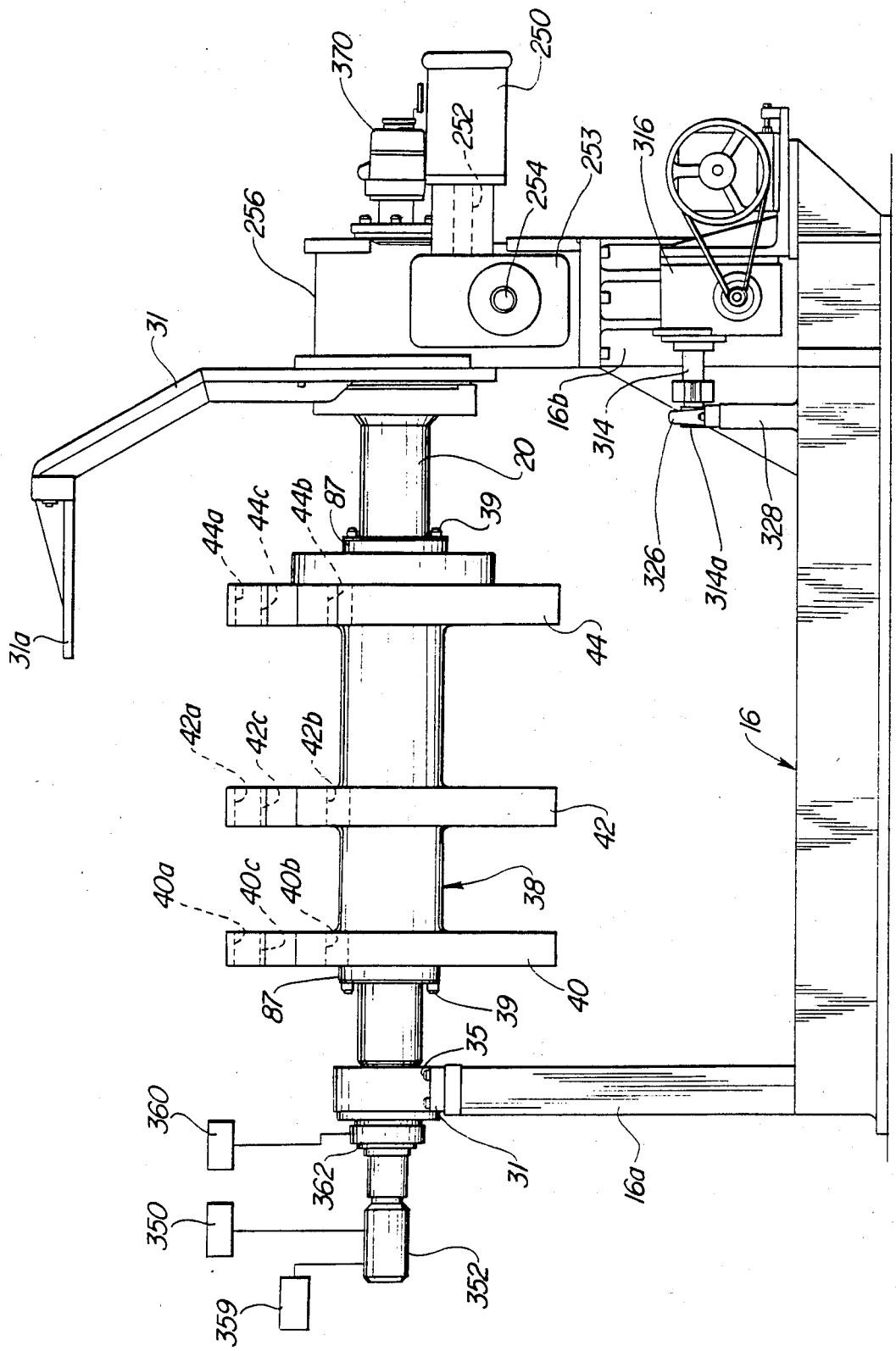
FIG. 4 is a side elevational view of the frame of the blow molding machine.
Figure 5:
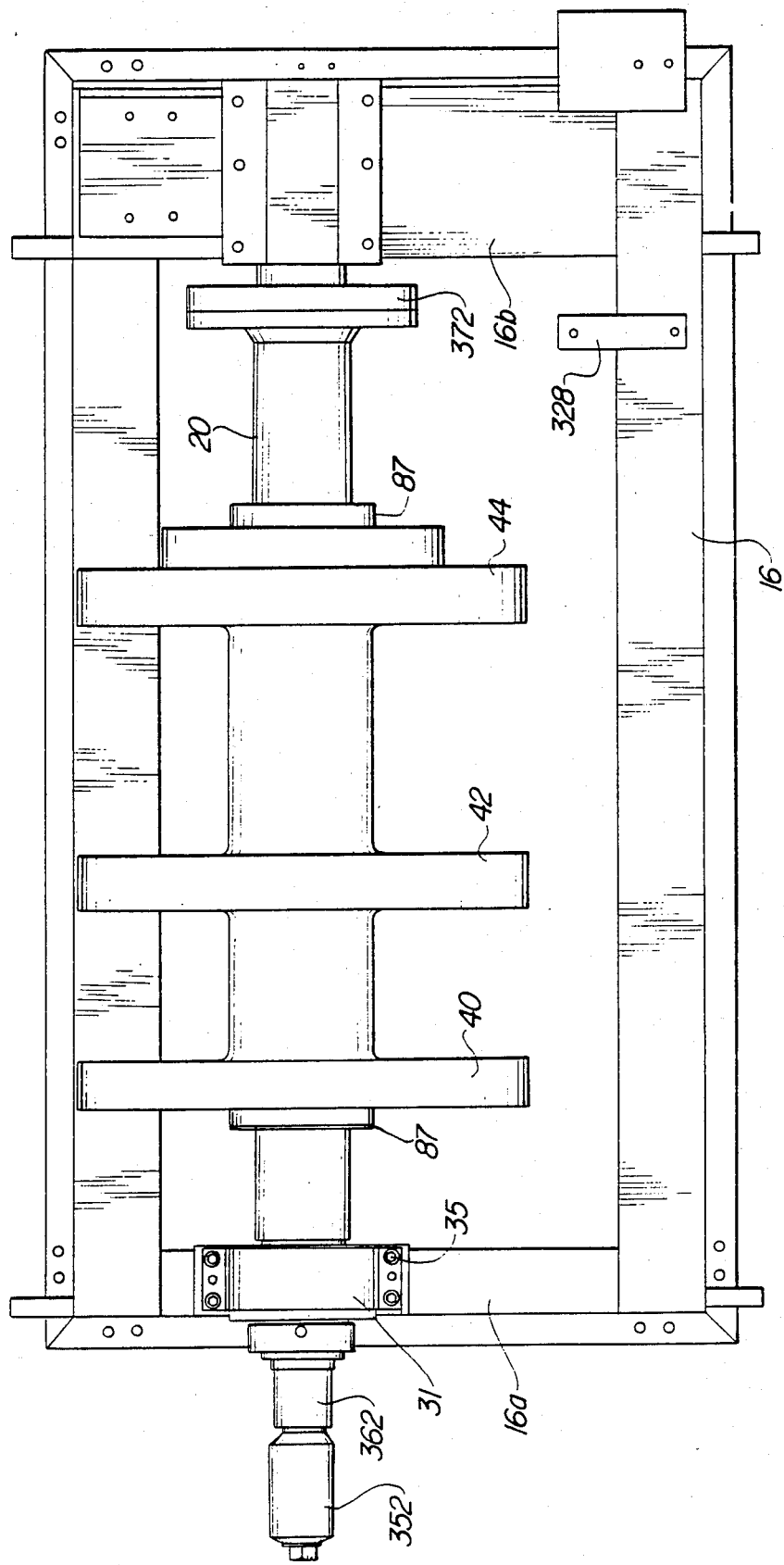
FIG. 5 is a plan view of the frame of the blow molding machine.

As is well known, a tubular (cylindrical) parison T is extruded from the extruder head 26 at a parison extruding station P1 as each mold station 12 is indexed beneath the extruder heads 26,27, FIG. 3. The extruder head 26 may extrude a single tubular parison T or may extrude a first tubular parison and then a second tubular parison inside the first tubular parison at the parison extruding station P1.

Each mold station 12 includes a pair of mold sections or halves 12a,12b that are opened at the parison extruding station P1 beneath the extruder head 26 and then closeable to capture the parison T extruded between the mold sections 12a,12b.

After capturing the parison T, each mold station 12 is indexed to a second angular position or station P2 of the rotary carousel 14. During indexing to the second angular position P2, the captured parison is blown to shape and then is cured during indexing from the second angular position P2 to the third, fourth and fifth angular positions P3,P4,P5 of the carousel 14. Between the fifth and sixth angular positions P5 and P6 of the carousel 14, the mold sections 12a,12b are opened and the blown article (blown parison) is removed, all as will be explained in detail hereinbelow.

The carousel shaft 20 is rotatably mounted on the upstanding, opposite ends 16a,16b of the base by bearing blocks 31 (only one shown) secured on the upstanding ends by machine screws 35. The carousel shaft 20 includes a central casting 38 having three radially extending and axially spaced apart carousel support plates 40,42,44 thereon, FIGS. 4-6. Each support plate 40,42,44 includes multiple sets of tie-bar receiving apertures 40a,40b,40c, 42a,42b,42c (only one set shown) and 44a,44b,44c (only one set shown) radially disposed and circumferentially spaced therearound. The apertures 40a,42a,44a are coaxial as are the apertures 40b,42b,44b and 40c,42c,44c. The central casting 38 is secured on the carousel shaft 20 by collars 87 and machine screws 39.

The carousel support plates 40,42,44 provide support means for supporting the mold stations 12 in radially disposed and circumferentially spaced apart relation on the carousel shaft 20.

Each mold station 12 carried on the carousel support plates 40,42,44 is identical and only one mold station 12 will be described in detail hereafter.

In particular, with reference to FIGS. 1-3 and 7-9, each mold station 12 includes tie-rods 50,52,54 which are received in the coaxial apertures 40a,42a,44a; 40b,42b,44b and 40c,42c,44c, respectively, of the support plates 40,42,44. In particular, the tie rods 50,52,54 are slidably mounted in sets of bushings disposed in the apertures 40a,40b,40c; 42a,42b,42c,44b and 44a,44b,44c. A ball bushing 55 and pair of ball bushings 57 slidably support the tie rod 54 on the respective carousel support plates 42,44 and resist bending forces on the tie rods at those locations. Ball bushings 59 slidably support each tie rod 50,52 on the respective carousel support plates 42,44. A set of outboard sleeve bushings 61 also support the tie rods 50,52 and 54 on the support plate 40 and are located to resist bending forces on the tie rods.

At each mold station 12, the tie-rods 50,52 are spaced laterally apart on the same lateral plane (i.e., the tie-rods 50,52 are substantially coplanar) whereas the tie-rod 54 is spaced intermediate the tie-rods 50,52 and displaced toward the axis of revolution R of the carousel shaft 20. A triangular pattern of tie rods 50,52,54 is thus provided when viewed from the end of the carousel shaft 20; e.g., see FIGS. 2,3.

Each mold station 12 includes a first pressure plate 56 and second pressure plate 58 mounted on the tie rods 50,52,54 adjacent opposite ends thereof. The first pressure plate 56 is mounted on the tie-rods 50,52,54 by a split ring 60 disposed in an undercut on the respective tie rods on one side of the pressure plate 56 and a respective threaded nut 64 on the other side of such pressure plate. The tie-rods 50,52,54 include threaded portions beneath the nut 64 for this purpose. Similarly, the second pressure plate 58 is mounted on the tie rods 50,52,54 by a split ring 62 on one side thereof and a threaded nut 66 on the other side thereof. Thus, the pressure plates 56,58 are mounted a fixed distance apart on the tie bars 50,52,54.

Each mold station 12 further includes mold sections 12a,12b comprising a first mold platen 70 and a second mold platen 72 mounted on the tie rods 50,52,54 for relative movement and molds 71,73 secured and carried on the respective mold platen 70,72. As mentioned hereinabove, the mold sections 12a,12b of each mold station 12 are openable and closeable as they are rotatably indexed. Opening and closing of the mold sections 12a,12b is effected by a hydraulic cylinder means 76 disposed between the first mold platen 70 and the first pressure plate 56, FIGS. 8–9. In particular, the hydraulic cylinder means 76 includes a cylinder 76a attached to the first mold platen 70 by trunnion 80 and a reciprocable piston 76b attached to an upstanding extension 56a by a trunnion 82. Actuation of hydraulic cylinder means 76 produces equal and opposite movement of the mold platens 70,72 and the molds 71,73 thereon toward or away from one another as will become apparent The second mold platen 72 is attached to an upstanding extension 58a of the pressure plate 58 by a trunnion 83. The second mold platen 72 and mold 73 thereon thus are moveable with the second pressure plate 56 which is movable with the tie rods 50,52,54 when the hydraulic cylinder means 76 is actuated. The second mold platen 72 includes oversized bores therethrough to accommodate the tie rods 50,52,54 extending therethrough.

The first mold platen 70 is supported on an enlarged, integral carriage portion 70a which is slidably mounted on the tie rods 50,52,54 by a set of ball bushings 100.

The first and second mold platens 70,72 are caused to move synchronously between the open and closed positions by the synchronizing mechanism 110 mounted on the carousel support plate 52. The synchronizing mechanism 110 includes a coupling lever 112 which is rotatable about a pivot shaft 114. The pivot shaft 114 is received and secured on the carousel support plate 42. One end 112a of the coupling lever 112 is connected by a drag link 116 to the carriage portion 70a of the mold platen 70 and the other end 112b is connected by a drag link 118 to the pressure plate 56.

When the hydraulic cylinder means 76 is energized to open the mold sections 12a,12b, the piston 76b is moved toward and into the cylinder 76a and the mold platen 70 is moved toward the pressure plate 56. The synchronizer 110 causes the pressure plate 56 and the tie rods 50,52,54 to be pulled to the right in FIGS. 8-9 to cause the pressure plate 58 affixed on the tie rods to be moved away from the pressure plate 56. When the hydraulic cylinder means 76 is energized to close the mold sections 12a,12b, the reverse movement of the pressure plates 56,58 and platens 70,72 occurs. Thus, actuation of hydraulic cylinder means 76 produces equal and opposite movement of the mold platens 70,72 and the molds 71,73 carried respectively thereon.

When the mold sections 12a,12b are closed and clamp pressure is applied by the hydraulic cylinder means 76, the tie rods 50,52 are placed in tension and the tie rod 54 is placed in compression. In this situation, there is a tendency to bend the tie rods. The trunnions 80, 82 and 83 accommodate relative pivotal motion of the mold platens 70,72 from these bending forces and maintain the platens 70,72 parallel to one another. Without the trunnions 80, 82 and 83, there would be a tendency by reason of the bending stresses for the mold platens 70,72 and hence the mold sections 12a,12b secured thereon to move out of parallel.

Figure 7:
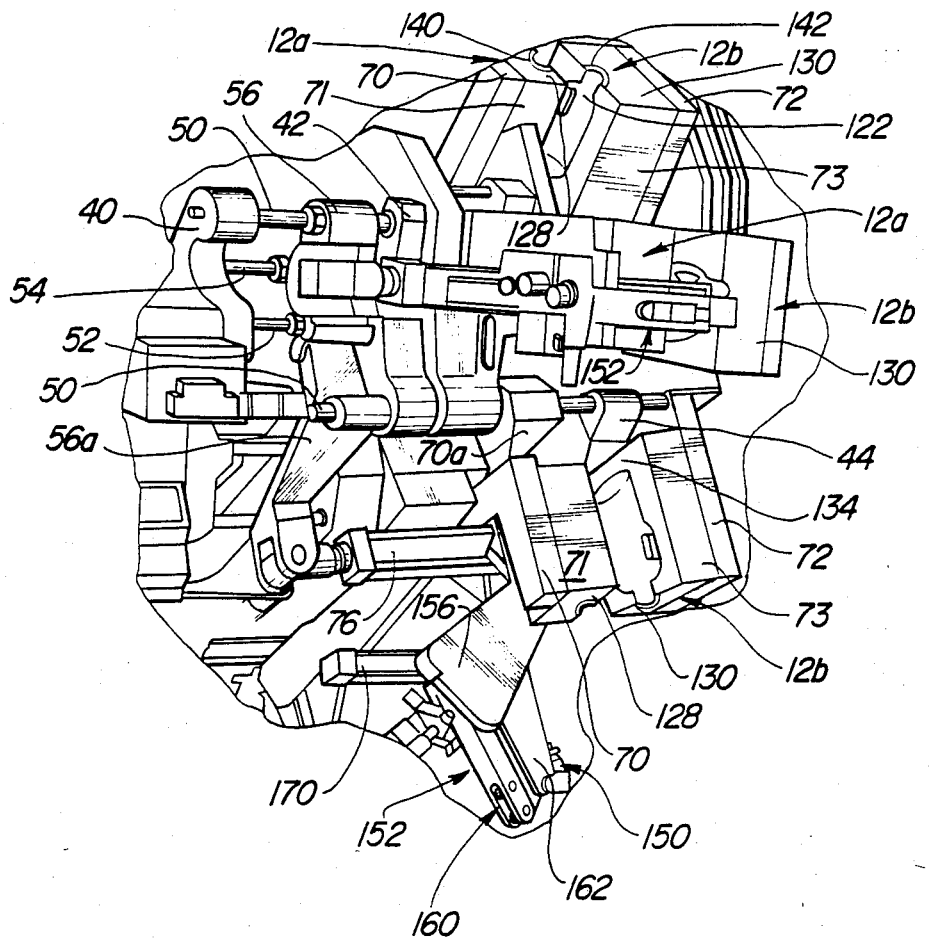
FIG. 7 is an enlarged, partial perspective view of the mold stations on the blow molding machine of FIG. 1.
Figure 10:
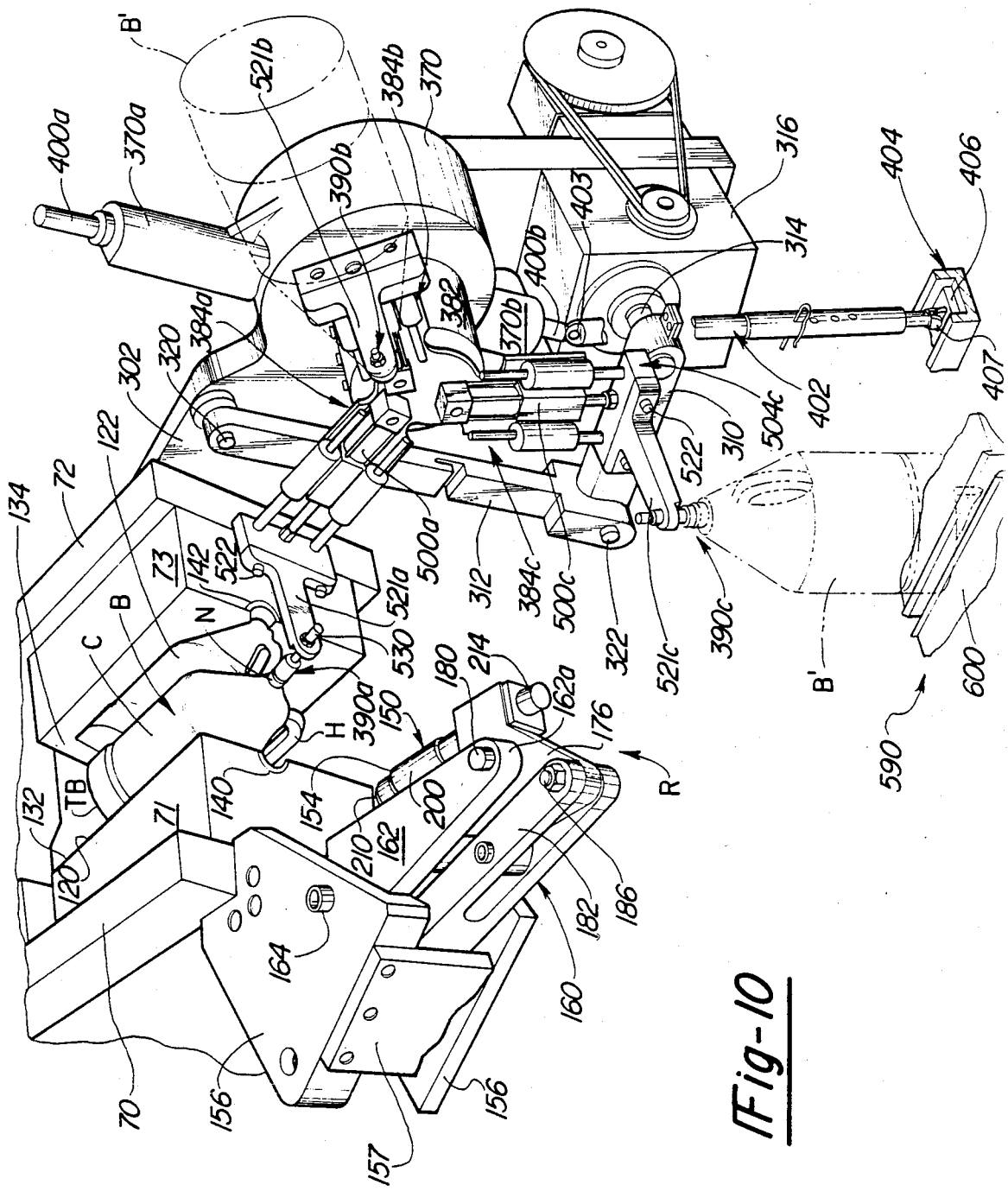
FIG. 10 is a partial perspective view of the take-out mechanism and a mold station on the rotary carousel at the bottle take-out position P5.

As shown best in FIGS. 7 and 10, the molds 71,73 each include contoured, inner surfaces 120,122 that define, when the molds 71,73 are closed and mated at the parting plane M, a blowing cavity 124 and a mold mouth 126 extending from the blowing cavity 124 to the exterior surfaces 128,130 on the mold sections 12a,12b, respectively. The blowing cavity 124 is shaped to impart the desired bottle shape to the parison T when the parison is blown in the blowing cavity 124 as will be described hereinbelow. A typical bottle B produced by blowing the parison T in the blowing cavity 124 is shown in FIG. 10 as including a threaded bottle neck N, handle H and container C.

The mold mouth 126 extends from the blowing cavity 124 and opens outside the closed molds 71,73 so as to receive a blow pin 150 of a blowing/neck finishing mechanism 152 after the parison T is captured between the mold sections 12a,12b of each mold station 12 as will be explained hereinbelow.

Figure 18:
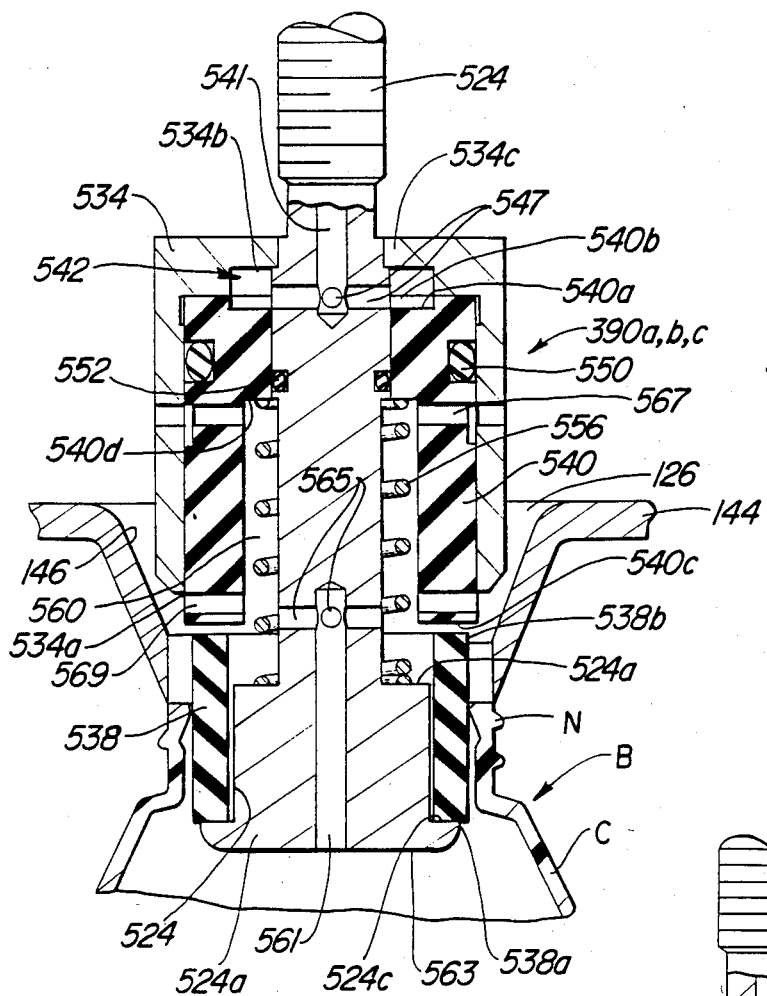
FIG. 18 is a longitudinal sectional view of the take-out pin of the invention inserted in the neck of a blown bottle before the pin is expanded.
Figure 19:
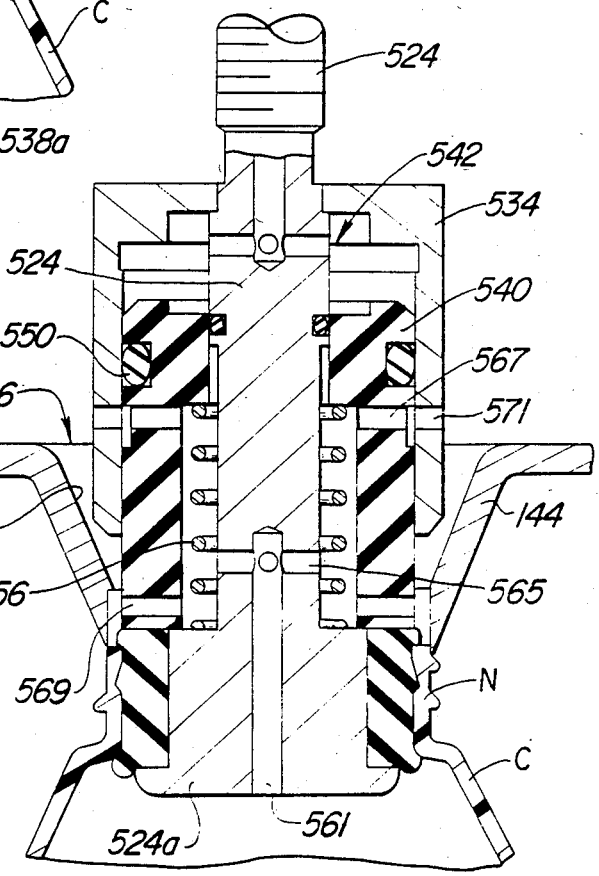
FIG. 19 is similar to FIG. 18 with the take-out pin expanded to grip the neck of the blown bottle from the inside.

The parison T is captured by closing the molds 71,73 of the mold sections 12a,12b onto the parison as it is extruded therebetween at position P1. When the mold sections 12a,12b are closed onto the tubular parison T at position P1, the bottom portion TB of the parison T is pinched and closed by pinch surfaces 132,134 on the molds 71,73 and the top of the parison T is received in the mold mouth 126 as shown in FIGS. 10 and 18–19.

The mold mouth 126 is formed by a pair of strike inserts 140,142 that are received in counterbores in the mold plates 71,73 and that together form an annular strike member 144 when the mold sections 12a,12b are closed, FIG. 8. The annular strike member 144 so formed includes a truncated conical inner surface 146 on which the top of the parison T is received.

When the blow pin 150 is inserted in the mold mouth 126, an annular shear ring surface 154 on the blow pin pinches and cuts (trims) the top of the parison T, Each blowing/neck finishing mechanism 152 is of the type described in copending U.S. patent application Ser. No. 252,741 entitled "Rotary Blow Molding Machine Having Mold Station Blowing/Neck Finishing Mechanisms" filed in the names of M. Warren Martin and Lawrence H. Weber as inventors and of common assignee herewith, the teachings of which are incorporated herein by reference. Briefly, each blowing mechanism includes a pair of spaced apart, side-by-side support members 156 that are fastened together by upper connector plate 157 and lower connector plate (not shown) disposed therebetween. The lower connector plate 159 is fastened on the first mold platen 70. Mounted between the support members 156 is a pivotal linkage 160. The linkage 160 includes a bellcrank arm 162 that is pivotally mounted between the support members 156 by a pivot pin 164. The aft end of the bellcrank arm 162 is pivotally connected to the output piston of a fluid cylinder 170, FIG. 7. The cylinder 170 is secured between the support members 156. The forward end 162a is connected to a blow pin support plate 176 by pivot pin 180.

The pivotal linkage 160 also includes a second link 182 pivotally mounted between the support members 156 and pivotally connected to the blow pin support plate 176 by a pivot pin 186. Second link thus is parallel to bell crank arm 162 and 182 functions to maintain the longitudinal axis of the blow pin 150 substantially parallel to the longitudinal axis of the mold mouth 126 at all times.

FIG. 10 illustrates the blow pin 150 in the retracted position R where the blow pin is offset from the longitudinal axis of the mold mouth 126. In the operative blowing position, the blow pin 150 is inserted in the mold mouth 126 with the top of the parison T pinched between the annular shear surface 154 of the blow pin and the annular strike member 144 of the mold mouth 126.

The blow pin 150 includes a cylindrical threaded body 200 secured on the blow pin support plate 176. The cylindrical body 200 includes an end fitting 214 onto which an air line fitting (not shown) is attached for supplying blowing air. The cylindrical body 200 includes a longitudinal bore (not shown) therethrough that registers with a longitudinal bore in the blow pin tip 210 to conduct the blowing air from the fitting 214 to the blow pin tip 210 for discharge through multiple, circumferential apertures (not shown) in the blow pin tip.

The pivotal linkage 160 is designed to move the blow pin 150 along an arcuate (circular arc) path from the retracted position R shown in FIG. 10 to an operative inserted position (not shown) inserted in the mold mouth 126. Importantly, the location of the pivots of the linkage 160 as well as distances between the pivots is selected to provide for minimum arcuate travel of the blow pin 150 (to provide movement of the blow pin along a path that is as straight as possible) as it approaches and is inserted in the mold mouth 126 as explained in the aforementioned copending U.S. patent application entitled "Rotary Blow Molding Machine Having Mold Station Blowing/Neck Finishing Mechanisms".

The carousel shaft 20 is driven in incremental rotation by an electric motor 250 mounted on the upstanding end 16a of the base 16. The output shaft 252 of the electric motor 250 enters a gear reducer 253. The output shaft 254 of the gear reducer drives a conventional rotary indexer 256. The rotary indexer 256 is affixed on the upstanding end 16a of the base 16 and drives the carousel shaft 20 in incremental rotation to rotatably index the mold stations 12 on the rotary carousel 14.

In the blow molding machine described hereinabove, hydraulic fluid is supplied from a single, common hydraulic fluid pressure source 350 to each hydraulic cylinder means 76 of each mold station 12 through a rotary joint 352 on the end of the carousel shaft 20. A suitable hydraulic fluid pressure regulator 354 is carried on the rotary carousel 14 and is interconnected between the fluid pressure source 350 and each hydraulic cylinder means 76. A check valve device 356 is also provided on the rotary carousel 14 adjacent the pressure regulator 354. The check valve device 356 is disposed between the fluid pressure source 350 and the hydraulic cylinder means 76 to sustain the clamp pressure supplied to each cylinder 76a at a desired level without continual open circuit pressurization from the fluid pressure source 350. Use of the check valve devices 365 allows a single, common fluid pressure source 350 to serve each hydraulic motor 76 of each mold station and provide adequate fluid pressurization thereto for clamping each pair of mold sections 12a, 12b together.

Similarly, hydraulic fluid for the cylinder 170 that actuates the pivotal linkage 160 of the blowing mechanism 152 is supplied from a fluid pressure source 359 through the same rotary joint 352 on the end of the carousel shaft 20.

Regulated pneumatic pressure to the blow-pin 150 of each mold station 12 is supplied from an air pressure source 360 through a rotary pneumatic connector 362 on the rotary joint 352.

Figure 2:
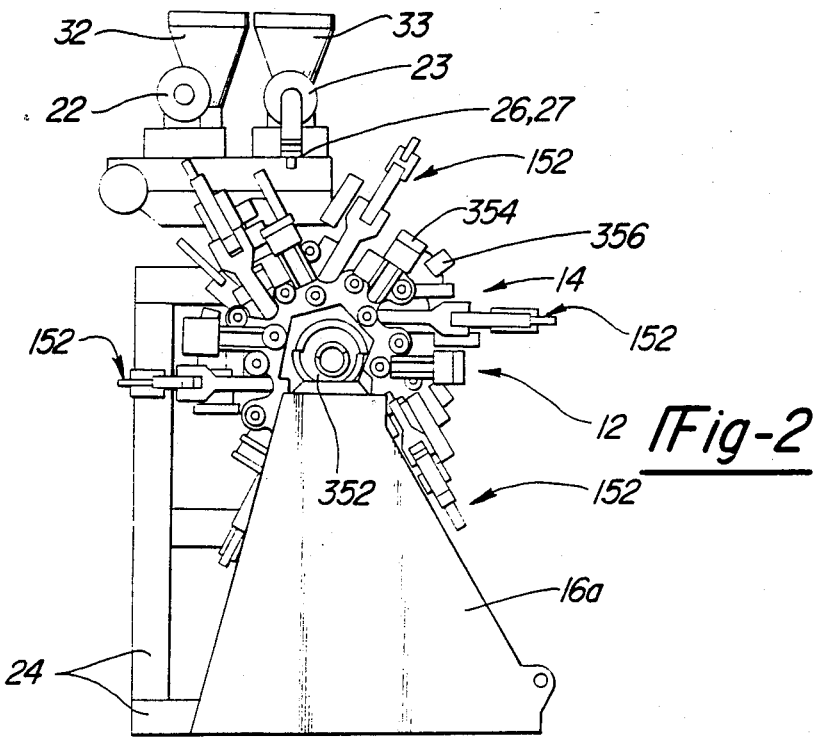
FIG. 2 is an end elevational view of the blow molding machine in the direction of arrow 2 in FIG. 1.

Hydraulic lines and pneumatic lines between the various components are not shown in FIGS. 1 and 2 for drawing simplification purposes.

Furthermore, brushes (not shown) and slip rings (not shown) are provided on the carousel shaft 20 for electrical connections to the components thereon.

A rotary water union 370 is provided on the end of the carousel shaft 20 to supply cooling water to an annular water manifold 372 carried on the carousel shaft 12. Water conduits (not shown) extend from the manifold 372 to the mold sections 12a, 12b of each mold station 12 on the rotary carousel 14. The mold sections 12a, 12b of each mold station 12 include internal cooling passages (not shown) through which cooling water is flowed to maintain the temperature of the mold sections 12a, 12b at the desired value.

It is apparent from FIGS. 1-3 that the rotary carousel 14 carries six mold stations 12 which are identical and constructed as described hereinabove. The rotary carousel is indexed in 60° increments of rotation by the indexer 256 to place each mold station 12 at the six successive angular positions or stations P1-P6.

At the first angular station or position corresponding to the parison extruding station P1, the overhead extruder head 26 extrudes the tubular parison T between the mold sections 12a, 12b which are held open at the station P1 by the hydraulic cylinder means 76. When the parison T is fully extruded, the mold sections 12a, 12b are closed by the hydraulic cylinder means 76 to capture the extruded parison T. The rotary carousel 14 is indexed counterclockwise 60° in FIG. 2 (clockwise in FIG. 3) to the second angular position P2 so that the next following mold station 12 on the carousel 14 is positioned at the parison capturing position P1 with the mold sections 12a, 12b thereof open. As the just closed mold station 12 begins to leave the station P1, the extruder head 26 is rocked upwardly by the cylinder/piston assembly 30. The parison T is severed from the extruder head 26 by engaging an inner mandrel (not shown) in the extruder head against an outer extruder head die (not shown) to cut the parison T therebetween in known manner in the extruder head 26. This cutting of the parison T in the extruder head 26 is referred to as die closure cutting. Moreover, as shown best in FIGS. 2 and 3, each mold station 12 is positioned at the parison extruding station P1 off of top dead center (relative to a vertical plane through the axis of rotation R of the carousel 14) so that there is a vertical component of movement of each mold station 12 as it is indexed from position P1 toward the second angular position P2. This vertical component of motion of each mold station 12 after capturing the parison T maintains parison separation from the extruder head 26 after die closure cutting.

After the parison T is severed from the extruder head 26 and as the closed mold station begins to leave the position P1 after capturing the parison T, the blow pin 150 is inserted into the mold mouth 126 by actuation of linkage 160. When the blow pin is inserted, the shear ring 154 thereon and the annular strike member 144 in the mold mouth cooperate to pinch and cut the top of the parison T captured between the closed mold sections 12a,12b.

Once the blow pin 150 is inserted in the mold mouth 126, blowing air is supplied to the blow pin through fitting 214 to blow the thermoplastic parison T to shape in the blowing cavity 124 as the mold station is indexed to the second angular position P2. The blow molded article (i.e., bottle B) is then cured at an elevated temperature with the blow pin 150 inserted in the mold mouth 126 while the mold station is indexed to second, third and fourth angular positions P2,P3,P4. Before each mold station 12 reaches the fifth angular position (corresponding to a take-out position P5), the blow pin 150 is extracted from the mold mouth 126 and returned to the retracted position R with a stripper member (not shown) carrying the cut-off top of the parison T for disposal and recycling.

At the fifth angular position P5, removal of the blown bottle B from each mold station 12 is initiated by an automatic take-out mechanism 300. Referring to FIGS. 3 to 10-17, the take-out mechanism 300 includes an elongate turret arm 302 having an annular collar 304 rotatably disposed on the carousel shaft 20 for relative rotational motion. The turret arm 302 is relatively rotatable on the carousel shaft about the axis of revolution R of the carousel shaft. For reasons to become apparent hereinafter, the turret arm 302 is oscillated about the axis of revolution R by a crank 310 and link 312 driven by an output shaft 314 of a gear reducer 316. The link 312 is pivotally connected to the turret arm 302 by pivot pin 320 and to the crank 310 by pivot pin 322. The crank 310 is secured on the output shaft 314 for rotation therewith. The outboard end 314a of the output shaft 314 is supported in a bearing block 326 on a small upstanding extension 328 of the base 16.

Figure 6:
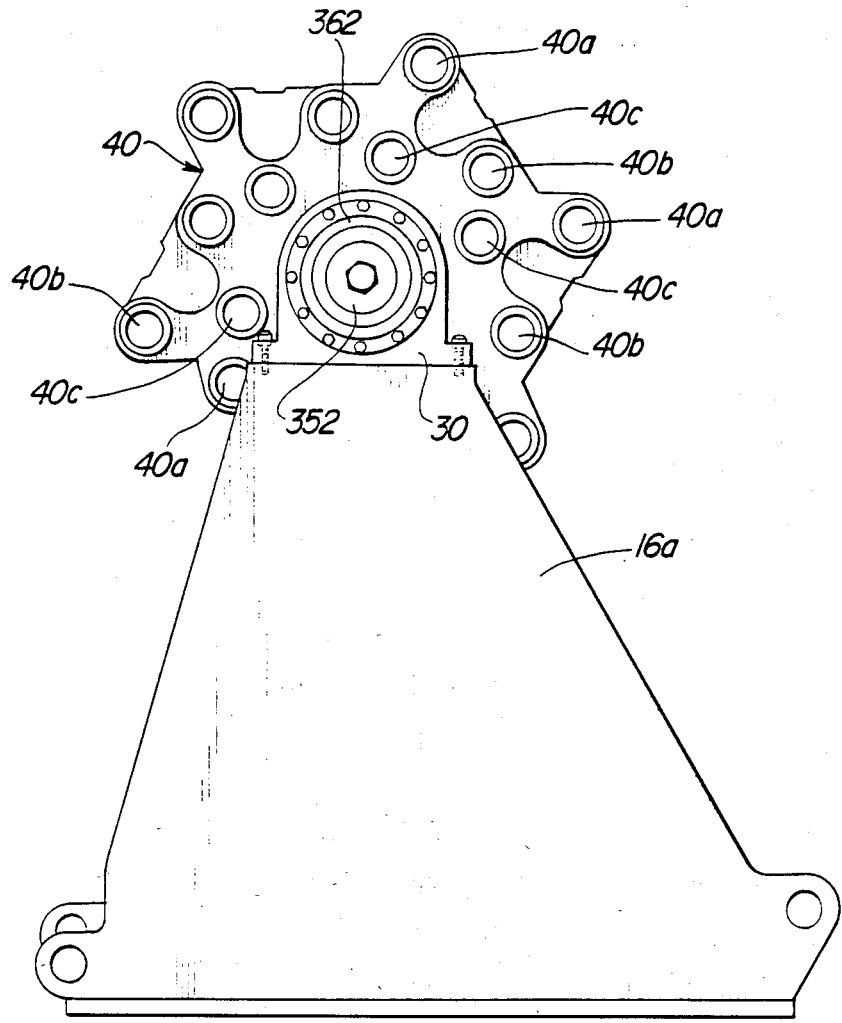
FIG. 6 is an end elevation of the frame of FIG. 4.

The other end of the output shaft 314 extends into the gear reducer 316 where it is rotatably supported and driven by a driven shaft 330 extending into the gear reducer 316 normal to the axis of the output shaft 314. The driven shaft 330 is connected to another driven shaft 332 through coupling 334. Driven shaft 332 is further connected by a coupling 335 to a driven shaft 336 having a pulley 338 driven by endless belt 340. As shown in FIG. 6, the driven shaft 336 is rotatably supported by a pair of bearing blocks 344,346 on the base 16.

The endless belt 340 wraps around a drive pulley 351 and a belt tension-controlling pulley 352 mounted on a stub shaft 354 extending from the base 16. The drive pulley 351 is rotated by the output shaft 254 of the gear reducer 253. As mentioned hereinabove, the output shaft 254 is driven by the electrical motor 250 through the gear reducer 253.

In this way, the carousel shaft 20 is rotatably indexed by the output shaft 254 through the rotary indexer 256 and the crank 310 and turret arm 302 are rotatably indexed from the solid line position of FIG. 3 to the phantom line position by the same output shaft 254 through the transmission components mentioned (e.g., pulleys 338,351,352, belt 340, shafts 314,330,332 etc.) in synchronism with indexing of the carousel shaft 20. In particular, as the carousel shaft 20 is rotatably indexed 60° from the take-out position P5 toward the position P6, the turret arm 302 will rotate upwardly about the axis of revolution R of the carousel shaft in synchronism with rotation of the carousel shaft until the crank 310 reaches a straight line relation with the link 312. Then, the crank 310 begins to rotate the turret arm 302 downwardly to its original lower starting position shown in FIG. 3 in solid at the take-out station P5. The maximum upper position of the turret arm 302 is shown in phantom in FIG. 3.

The turret arm 302 is thus caused to oscillate rotatably about the axis of revolution R of the carousel shaft 20 between the lower position and upper position as controlled by rotation of the crank 310. The upward rotation of the turret arm 302 to the maximum upper position is in synchronism with the rotary indexing of the carousel shaft 20 to move each mold station 12 from position P5 to the next angular position or station P6 for reasons to be explained hereinbelow.

Figure 11:
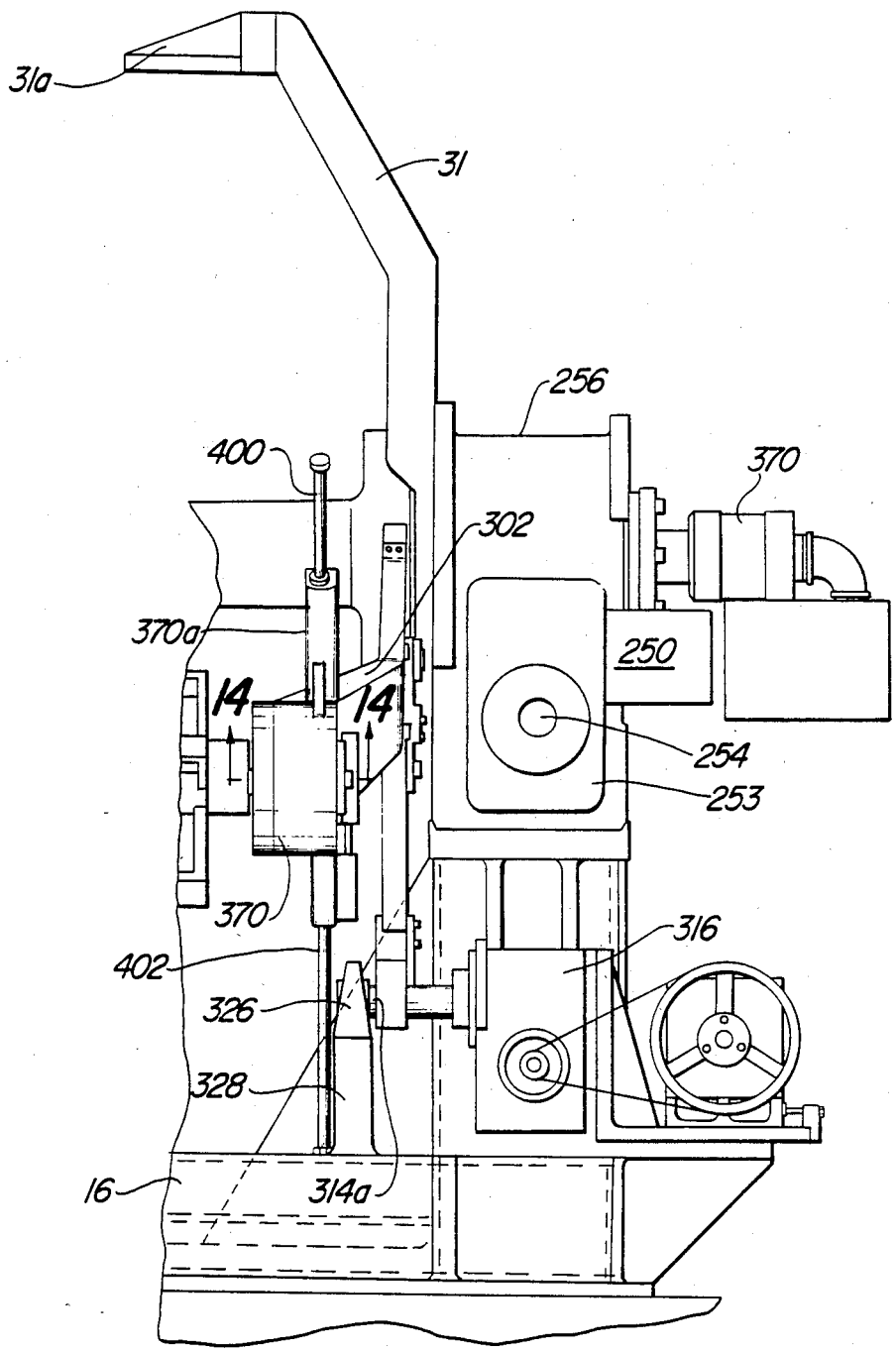
FIG. 11 is a partial side elevational view of the take-out mechanism.

As shown best in FIGS. 3 and 10-11, the turret arm 302 extends laterally from the carousel shaft 20 and terminates in an enlarged turret hub 370. Rotatably mounted in the turret hub 370 by anti-friction bearings 372,374,376 is a rotary indexable spindle assembly 380. The spindle assembly 380 includes a spindle hub 382 on which three elongate take-out members or arms 384a,b,c are radially disposed and circumferentially spaced apart. As will be explained in detail hereinbelow, each take-out member 384a,b,c includes an expandible take-out pin 390a,b,c for gripping a blown bottle B at each mold station 12 successively indexed to the bottle take-out position P5.

As is apparent, with three take-out members 384a,b,c and six mold stations 12, the spindle hub 382 must be rotatably indexed 120° for each 60° rotary indexing of the carousel 14. The 120° indexing of the spindle hub 382 is in synchronism with the rotary indexing of the carousel 14 in order to position one of the take-out members 384a,b,c at the take-out position P5.

Rotary indexing of the spindle assembly 380 in synchronism with rotary indexing of the carousel 14 is effected by the oscillation of the turret arm 302 about the axis of revolution R of the carousel shaft 20 in synchronism with rotary indexing of the carousel shaft 20. In particular, the turret hub 370 includes upper and lower cylindrical hub extensions 370a,370b. An elongate, toothed rack 400 is received in the turret hub 370 and extensions 370a,b for relative sliding motion. The upper end 400a of the rack is free whereas the lower end 400b of the rack is pivotally connected to a rack support member 402 by pivot pin 403. The rack support member 402 in turn is secured against vertical movement in the base channel 404. To this end, the rack support member 402 includes a base plate 406 pivotally connected to the rack support member 402 by pivot pin 407 and received in the base channel 404 for sliding movement along its length but not vertical movement relative to the base channel. The pivot connections between the rack 400, rack support member 402 and base plate 406 allow lateral flexing movement of these components as shown in FIG. 3 (for the two extreme flexed positions shown) to accommodate oscillation of the turret arm 302 about the axis of revolution R of the carousel shaft 20.

The spindle assembly 380 includes a hollow spindle shaft 410 rotatably disposed in the turret hub 370 by the anti-friction bearings 372,376. The turret hub 370 includes a main body 412 and annular cover 416 fastened together. Bearings 372 are mounted in cover 416 while bearings 376 are mounted in the main body 412. Collars 417,419 are provided to maintain the bearings 372,376 in position on the spindle shaft 410.

Figure 12:
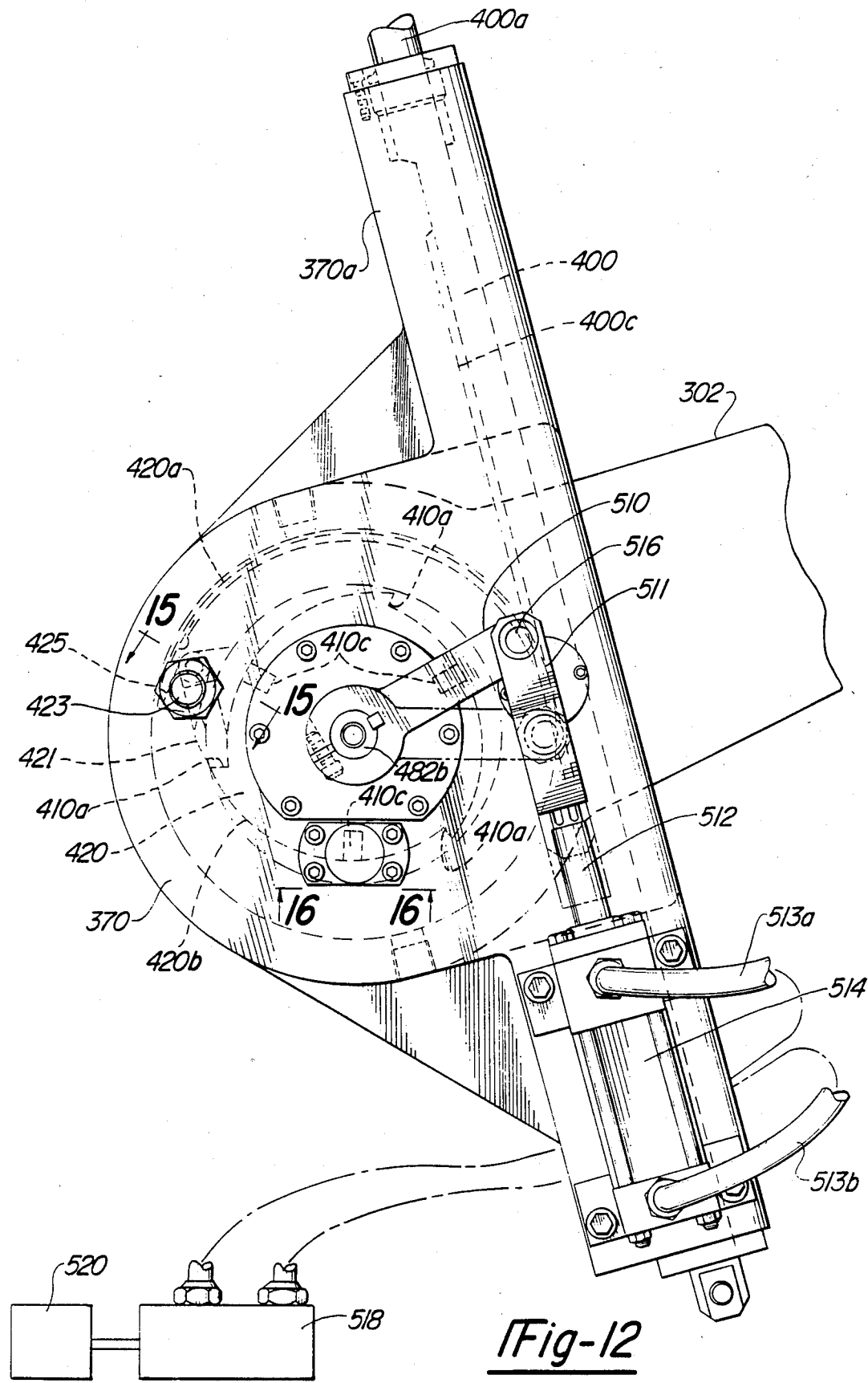
FIG. 12 is a rear elevational view of the turret of the take-out mechanism.

Mounted on the spindle shaft 410 by a pair of bearings 374 is a pinion 420. The pinion 420 includes a 120° toothed peripheral segment 420a, FIG. 12, around its circumference. The remainder of the periphery of the pinion 420 comprises a recessed, toothless segment 420b.

The toothed segment 420a of the pinion 420 is positioned relative to the rack 400 to provide intermeshing between the rack teeth 400c and the toothed segment 420a of the pinion when turret arm 302 is at the top of its stroke, FIG. 3, and begins to oscillate downwardly toward the bottom of its stroke. When the toothed segment 420a and rack 400 intermesh, the spindle shaft 410 is driven in rotation by a pawl 421 on the pinion 420 engaging one of a plurality of peripheral detents 410a in the flange 410b on the spindle shaft. The pawl 421 is fastened to the pinion 420 by a shoulder screw 423 and is spring biased by coil spring 425 to engage a respective detent 410a, FIG. 12 as the turret arm 302 is oscillated. The spindle shaft 410 will be rotatably indexed 120° by intermeshing of the toothed segment 420a and the rack 400. Of course, rotary indexing of the pinion 420 imparts similar motion to the spindle assembly 380 and the take-out members 384a,b,c mounted on the spindle hub 382.

In lieu of using a rack 400 and pinion 420 drive to rotary index the spindle assembly 380, a fluid cylinder may be mounted o the turret hub 370 and include a piston connected to the pinion 420 (in particular to an annular extension of a body shaped generally like the pinion 420 extending toward collar 419 and accessible from that side of the turret hub 370) for rotary indexing the spindle assembly 380 as described hereinabove. In this embodiment, the pinion 420 would not include toothed segment 420a.

The annular flange 410b of the spindle shaft 420 includes the detents 410c spaced 120° apart on the side 410d thereof. A spring biased shaft-locking member 426 is slidably mounted in a tubular insert 428 received in and affixed on the main hub body 412 by screws 429. The locking member includes a sliding body 433, dowel pin 434 on which a ball bearing assembly 436 is journaled. The outer race 436a of the bearing assembly rides on the side 410d of the shaft flange 410b. The shaft locking member 426 is biased by spring 430 to engage in each detent 410c after 120° indexing of the spindle shaft 410 to releasably hold the spindle shaft 410 and thus the take-out arms 384a,b,c on the spindle hub in the indexed position during oscillation of the turret arm 302. The locking member 426 is released when the pinion 420 and rack 400 again intermesh. In particular, the side 410d of the shaft flange 410b biases the locking member 426 into the tubular insert 428 against the bias of spring 430 until the next detent 410c is encountered.

A short rod 440 in the insert 428 is received in a slot of the locking member to control movement of the sliding body 433 of the locking member in the insert 428; i.e., to set maximum limits of pawl movement toward and away from the side face 410d of the pinion 400.

Figure 14:
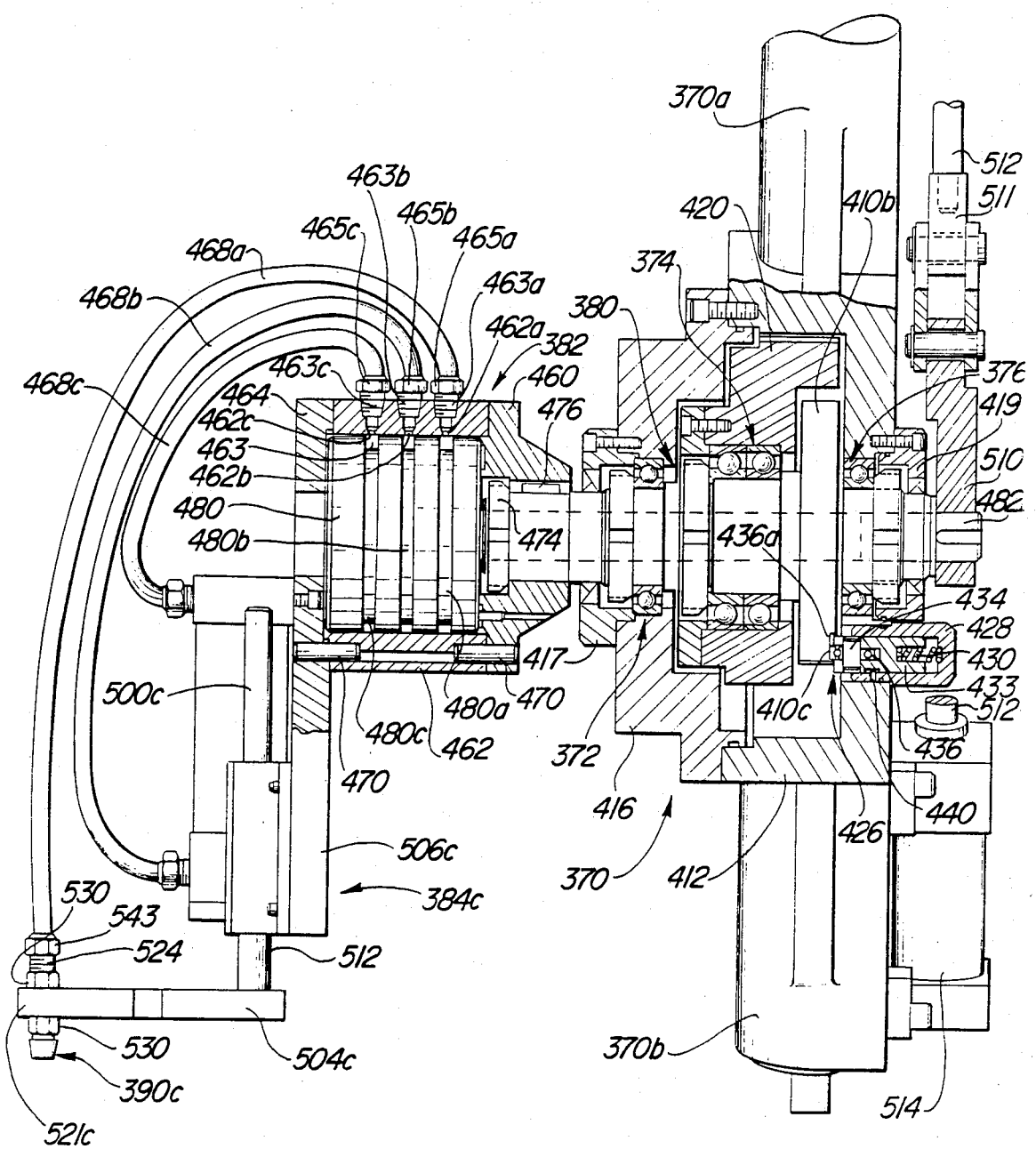
FIG. 14 is a sectional view of the turret of the take-out mechanism taken along lines 14—14 of FIG. 11.

As shown best in FIG. 14, the spindle hub 382 comprises an inner end hub member 460, intermediate hub member 462 and outer end hub member 464 secured together by multiple screws 468 and aligned by multiple dowel pins 470.

The inner end member 460 is fastened onto the end of the spindle shaft 410 by a threaded collar 474 and key 476 received in keyway in the spindle shaft 410.

The intermediate hub member 462 includes a cylindrical inner chamber 463 having three inner, arcuate air pressure grooves 462a,b,c with each groove 462a,b,c having three sets of circumferentially space apart threaded ports 463a,b,c in communication therewith to receive a respective fitting 465a,b,c. The three sets of threaded ports 462a,b,c are spaced 120° apart on the spindle hub behind the take-out members 384a,b,c.

The three sets of fittings 465a,b,c are connected to three sets of air pressure conduits or lines 468a,b,c.

Each set of lines 468a,b,c extends to a respective one of three fluid cylinders 500a,b,c on the take-out members 384a,b,c and the respective take-out pin 390a,b,c on each take-out member 384a,b,c. For example, the air line 468a of each set extends to the respective take-out pin 390a,b,c on each take-out member 384a,b,c. The air line 468b extends to one inlet port of each cylinder 500a,b,c while the air line 468c extends to the other inlet port of each cylinder 500a,b,c. Cylinders 500a,b,c are double acting cylinders (i.e., operable to move their pistons 502i a,b,c in opposite directions depending upon which inlet port is pressurized).

Rotatably received in the chamber 463 of the spindle hub 370 is a spool valve 480 having three arcuate grooves 480a,b,c that are in registry with grooves 462a,b,c, respectively, when the spool valve is received in the chamber 463.

The spool valve 480 is disposed on the end of a spool shaft 482 that is rotatably received in the longitudinal bore 483 of the spindle shaft 410, FIGS. 14 and 17. The opposite end of the spool shaft 482 includes a threaded port 485 to which an inlet fitting 487 is threadably attached to supply low pressure air from low air pressure source 489 to the longitudinal bore 490 and then to the groove 480a of the spool valve 480.

Figure 13:
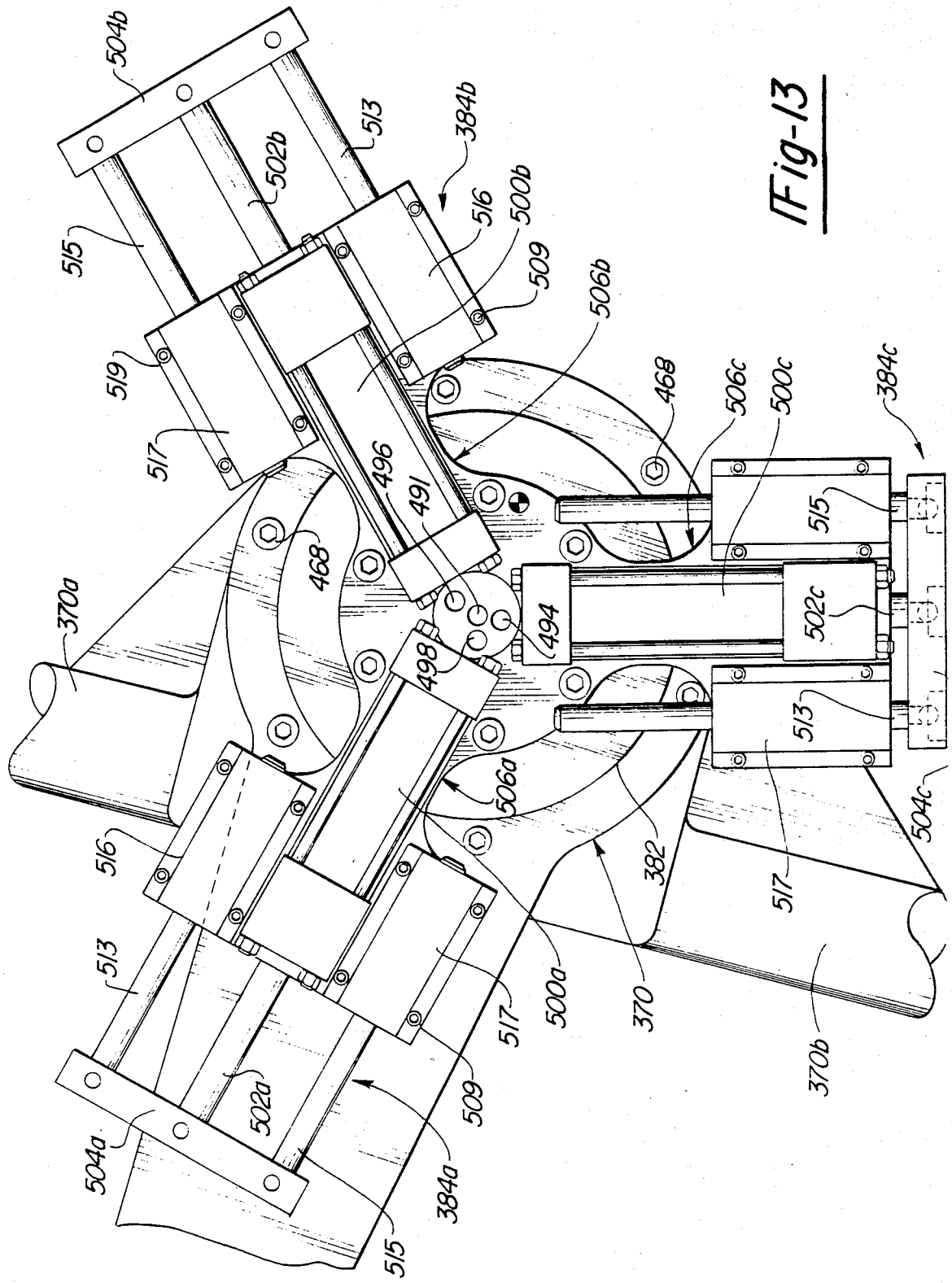
FIG. 13 is a front elevational view of the turret of the take-out mechanism.

High pressure air is supplied to grooves 480b,c of the spool valve through a threaded port 491 that threadably receives an inlet fitting 492 and a longitudinal bore 493. Inlet fitting 492 is connected to high pressure air source 495. Fluid pressure is exhausted from groove 480a through longitudinal bore 494 and from grooves 480b,c through longitudinal bores 496,498, respectively, FIGS. 13 and 17.

The spool valve 480 is designed to valve low pressure air to the take-out pins 390a,b,c on each take-out member 384a,b,c and to cylinders 500a,b,c in dependence on the rotary position of the spool valve in the chamber 463. The rotary position of the spool valve 480 is controlled by a crank 510 secured to the exposed end 482b of the spool shaft 482. The crank 510 is pivotably connected to a link 511. Link 511 is pivotally connected to the piston 512 of double acting air cylinder 514 by a pivot pin 516. Air lines 513a,b extend betWeen the cylinder 514 and a pneumatic valve 518. Air pressure to the double acting cylinder 514 is controlled by the pneumatic valve 518 which is actuated by a cam 520 driven off shaft 314 in synchronism with rotary indexing of the carousel shaft 20, FIG. 12.

The spool valve 480 is rotated by the crank arm 512 to provide low pressure blowing air to each take-out pin 390a,b,c after it is inserted in the bottle neck N to grip the bottle neck N from the inside as will be explained.

The spool valve 480 is rotated by the crank arm 510 to provide high pressure air to the inlet ports of cylinders 500a,b,c to either insert the take-out pin 390a,b,c in the bottle neck N at the position P5 or withdraw the take-out pin 390a, b or c from the bottle neck N.

The cylinders 500a,b,c are mounted on respective spindle arms 506a,b,c by suitable means. Each cylinder 500a,b,c includes the main piston 502a,b,c that is secured to a respective take-out pin support plate 504a,b,c. A pair of guide rods 513,515 is connected to each support plate 504a,b,c and each guide rod is guidingly received in a guide block 516,517, respectively, mounted on the spindle arms 506 by machine screws 509. When the main piston 502a,b,c is extended or retracted, the guide rods 513,515 and respective support plate 504a,b,c are extended or retracted with the main piston associated therewith.

A T-shaped take-out pin support plate 521a,b,c is secured to the respective support plate 504a,b,c by screws 522, FIG. 10. Each support plate 521a,b,c extends normal to the respective spindle arm 506 and carries one of the take-out pins 390a,b,c thereon. The take-out pin 390a,b,c is secured on the end of the respective support plate 521a,b,c by a threaded shank 524 thereof and upper and lower nuts 530 on the shank 524, see FIGS. 10 and 14.

The shank 524 of each take-out pin 390a,b,c extends into a tubular (cylindrical) body 534 having an open end 534a. The shank 524 includes an enlarged end 524a defining a cylindrical surface portion 524b intersecting a lower, annular shoulder portion 524c. The shoulder portion 524c extends normal to the cylindrical surface portion 524b and normal to the longitudinal axis of the shank.

A resilient sleeve 538 is received on the cylindrical surface portion 524b and includes an annular end 538a abutted against annular shoulder portion 524c. The tubular (cylindrical) resilient sleeve 538 preferably is made of an elastomeric material such as polyurethane.

The resilient sleeve 538 includes an opposite annular end 538b adapted to be engaged by an annular sleeve piston 540 that is slidably disposed in the take-out pin body 534. The piston 540 includes an end wall 540a having a counterbore 540b registered with a counterbore 534b in the end wall 534c of the body 534 to define a cylinder chamber 542. Air pressure is admitted to the chamber 542 through a longitudinal bore 541 and crossbores 547 in the shank 524. The bore 541 extends to a fitting 543 on the threaded end of the take-out pin to receive air pressure from each conduit 468a extending from the spindle hub 480.

When air pressure is supplied to the chamber 542, the sleeve piston 540 is moved from the retracted position shown in FIG. 18 to the extended position shown in FIG. 19 where the annular end 540c of the sleeve piston 540 engages the annular end 538b of the sleeve 538 to compress the sleeve 538 against the shoulder portion 524c and expand the transverse dimension of the sleeve 538 (diameter) to grip the bottle neck N from the inside, FIG. 19.

The sleeve piston 540 includes an o-ring seal 550 to seal against the tubular take-out pin body 534 and the shank 524 includes an o-ring seal 552 to seal against the sleeve piston 540.

When the chamber 542 is pressurized, the sleeve piston 540 is moved into engagement with the resilient sleeve 538 against the bias of coil return spring 556 that is disposed between the inner end wall 540d of the sleeve piston and a shoulder portion 524d on the shank end 524a. When pressure to chamber 542 is exhausted, the coil spring 556 returns the sleeve piston 540 to the retracted position of FIG. 18. When the sleeve piston is retracted, the resilient sleeve 538 returns to its original transverse dimension, FIG. 18, by its own resiliency to release the grip on the bottle neck N.

When the take-out pin 390a,b,c is inserted in the bottle neck N and the sleeve 538 is expanded to grip the bottle neck from the inside, hot air in the bottle B is vented through a longitudinal bore 561 in the shank end 524a through cross bores 565 and into an annular chamber 560 between the shank 524 and sleeve piston 540. Venting the hot air in the bottle B prevents deformation of the blown shape from a relative vacuum that could be established in the bottle as the hot air cools.

The sleeve piston 540 includes two axially spaced apart sets of cross bores 567 and 569 therethrough. Cross bores 567 register with cross bores 571 through the tubular body 534 when the sleeve piston is extended, FIG. 19, to vent hot air in the annular chamber 560 received from inside the bottle B to the outside the tubular body 534. Cross bores 569 similarly vent hot air in the annular chamber 560 outside the sleeve piston 540.

The take-out mechanism 300 is capable of removing a blown bottle B from each mold station 12 successively positioned at the bottle removal position P5 by rotary indexing of the carousel 14. In particular, one of the take-out members 384a,b,c is indexed to the position P5 in synchronism with indexing of the carousel 14. At the position P2, one of the take-out members 384a,b,c on the spindle assembly 380 is disposed at the position P5 with the longitudinal axis of the take-out pin 390a,b,c on that take-out member substantially coaxially aligned with the longitudinal axis of the mold mouth 126 and bottle neck N. At position P5, the cylinder 500a,b,c associated with that particular take-out member is actuated by rotation of spool valve 480 to move the aligned take-out pin into the bottle neck N through the mold mouth 126. Once the take-out pin 390a,b,c is inserted in the bottle neck N, FIG. 19, the resilient sleeve 538 on the take-out pin is expanded by air pressure supplied from the spool valve 480 to grip the bottle neck N from the inside.

As the mold station 12 is indexed next to the sixth angular position, the turret arm 302 is oscillated upwardly about the axis of revolution R of the carousel shaft 20 to enable the take-out member whose take-out pin 390a,b,c is gripping the bottle B at that mold station to track or follow the rotary motion of that mold station. During the rotary motion from the fifth angular position P5 to the sixth angular position P6, the mold stations 12a,12b of that mold station are opened by the hydraulic motor 76 of that mold station. When the turret arm 302 is at its maximum upward position or stroke, FIG. 3, the mold sections 12a,12b are fully open. At this point, the spindle assembly 380 is rotatably indexed by the rack 400/pinion 420 to rotate the spindle assembly clockwise 120° in FIG. 3 to remove the blown bottle B from between the opened mold sections 12a,12b.

Upon indexing of the spindle assembly 380, the turret arm 302 is oscillated back to its original lower position at position P5.

The previously removed bottle B, is indexed 120° to a trim station 590 having sliding shear 600 to trim the pinched bottom of the bottle B. The bottle is released at the trim station by releasing air pressure on the sleeve piston 540 of the take-out pin 390a,b,c such that the resilient sleeve 538 contracts to its original, smaller transverse dimension (diameter) to allow the bottle to fall by gravity from the take-out pin. Concurrently, the adjacent take-out member 384a,b,c is indexed to position P5 in position to be inserted into the next blown bottle of the next mold station 12 arriving at position P5.

This cycle is repeated to remove each blown bottle from each mold station successively positioned at the position P5.

While the invention has been described in terms of specific embodiments thereof, it is not intended to be limited thereto but rather only to the extent set forth hereafter in the following claims.

We claim:

1. A rotary blow molding machine comprising:
   (a) a base,
   (b) a carousel rotatably supported on the base about an axis of revolution,
   (c) means for rotating the carousel,
   (d) a plurality of mold stations mounted on the carousel in circumferentially spaced apart relation thereon, said mold stations each comprising a pair of mold sections closeable and openable by relative movement toward and away from one another for defining, when closed, a blowing cavity in which a parison is blown to form a blown article and a mold mouth communicating with the blowing cavity and through which the blown article is accessible, and
   (e) means for opening and closing the mold sections of each mold station, and
   (f) a take-out mechanism for removing the blown article from a respective pair of mold sections as they are rotated therepast, said take-out mechanism comprising a take-out member for gripping the blown article when said respective pair of mold sections is closed, means for rotating the take-out member about the axis of revolution of the carousel in synchronism therewith to cause the take-out member gripping the blown article between the closed mold sections to track rotation of said mold sections as they are opened, and means for rotating the take-out member gripping the blown article between the opened mold sections about another axis of revolution to remove the blown article from between the opened mold sections.

2. The machine of claim 1 wherein said axis of revolution of the carousel and said other axis of revolution are parallel.

3. The machine of claim 2 wherein said axis of revolution of the carousel and said other axis of revolution are horizontal.

4. The machine of claim 1 wherein the closed mold sections define a mold mouth communicating with the blowing cavity and through which mold mouth the blown article is accessible to the take-out member.

5. The machine of claim 1 wherein said take-out member is carried on an arm that oscillates about the axis of revolution of the carousel.

6. The machine of claim 5 wherein the take-out member is disposed on a spindle that is rotatably mounted on the oscillating arm for rotation about a spindle axis, whereby the take-out member is rotatable about the spindle axis and about the axis of revolution of the carousel when the arm oscillates.

7. The machine of claim 6 wherein said spindle axis of revolution is parallel to said axis of revolution of the carousel.

8. The machine of claim 1 wherein said take-out member includes means for gripping the blown article from the inside thereof.

9. The machine of claim 8 wherein said gripping means of the take-out member comprises an expandible pin on an outboard end of the take-out member, said pin entering inside the blown article where it is expanded to grip the blown article from the inside.

10. The machine of claim 9 wherein the expandible pin includes a resilient sleeve and a fluid piston to engage and expand the sleeve.

11. The machine of claim 1 wherein the mold sections open and close in a direction parallel with the axis of revolution of the carousel.

12. The machine of claim 1 wherein said means for rotating the take-out member about the axis of revolution of the carousel initially rotates the take-out member in the same direction as the direction of carousel rotation as the mold sections are opened and wherein said means for rotating the take-out member about said another axis of revolution then rotates the take-out member in an opposite direction to remove the blown article from between the opened mold sections.

13. A rotary blow molding machine comprising:
   (a) a base,
   (b) a carousel rotatably supported on the base about an axis of revolution,
   (c) means for rotating the carousel,
   (d) a plurality of mold stations mounted on the carousel in circumferentially spaced apart relation thereon, said mold stations each comprising a pair of mold sections openable and closeable to define, when closed, a blowing cavity in which a parison is blown to form an article accessible from outside the closed mold sections, and
   (e) a take-out mechanism for removing the blown article from a respective pair of closed mold sections as said pair is rotated therepast, said take-out mechanism comprising a turret rotatable about the axis of revolution of the carousel, a spindle disposed on the turret for rotation about a spindle axis and including a take-out member mounted thereon, means for rotating the spindle about the spindle axis to align the take-out member with a respective pair of closed mold sections, means for moving the aligned take-out member to grip the blown article between the closed mold sections, and means for rotating the turret about the axis of revolution of the carousel in synchronism therewith to cause the take-out member gripping the blown article to follow rotation of said respective pair of closed mold sections as they are opened for removing the blown article therefrom by rotation of the spindle about the spindle axis once the mold sections are opened.

14. The machine of claim 13 wherein the carousel is rotatably indexed about a horizontal axis of revolution.

15. The machine of claim 14 wherein said take-out mechanism includes a turret arm rotatable about the axis of revolution of the carousel and including said turret thereon.

16. The machine of claim 15 including means for oscillating the turret arm about the axis of revolution of the carousel in synchronism with rotary indexing of the carousel.

17. The machine of claim 16 including an auxiliary shaft driven in rotary indexing manner in synchronism with the carousel and a linkage disposed between the auxiliary shaft and the turret arm to oscillate the turret arm about the axis of revolution of the carousel in response to rotary indexing of said auxiliary shaft.

18. The machine of claim 15 wherein the means for rotating the spindle comprises a rack and pinion mechanism actuated by oscillation of the turret arm to rotatably index the spindle in synchronism with rotary indexing of the carousel.

19. The machine of claim 18 wherein the pinion is rotatably disposed in the turret and the rack extends through the turret for movement of the pinion therepast in oscillating manner about the axis of revolution of the carousel as the turret arm is oscillated.

20. The machine of claim 19 wherein the rack is pivotally mounted on a support to accommodate oscillation of the pinion about the axis of revolution of the carousel.

21. The machine of claim 13 wherein the closed mold sections define a mouth communicating with the blowing cavity and through which mouth the blown article is accessible to the take-out member.

22. The machine of claim 21 wherein said means for moving the aligned take-out member to grip the blown article moves said take-out member toward the mouth to grip the blown article through said mouth.

23. The machine of claim 13 wherein said means for moving the aligned take-out member toward the mouth to grip the blown article comprises means for moving the take-out member inside the blown article to grip same from the inside.

24. The machine of claim 23 wherein the take-out member includes an expandable pin on the end thereof, said pin entering inside the blown article where it is expanded to grip the blown article from the inside.

25. The machine of claim 24 wherein the expandable pin includes a resilient sleeve and a fluid piston to engage and expand the sleeve.

26. The machine of claim 25 wherein the resilient sleeve is made of elastomeric material.

27. The machine of claim 25 wherein said spindle includes a fluid pressure spool valve to supply fluid pressure to the expandable pin when it is inside the blown article to expand the pin to grip the article from the inside.

28. The machine of claim 13 wherein said spindle includes a plurality of radially disposed, circumferentially spaced apart take-out members mounted thereon.

29. The machine of claim 13 wherein the spindle axis is parallel with the axis of revolution of the carousel.

30. The machine of claim 29 wherein the mold sections open and close in a direction parallel with the axis of revolution of the carousel.

31. The machine of claim 30 wherein said means for moving the aligned take-out member toward the mouth to grip the blown article moves the takeout member along an axis normal to the axis of revolution of the carousel.

32. The machine of claim 13 wherein said means for rotating the turret about the axis of revolution of the carousel initially rotates the take-out member therein in the same direction as the direction of carousel rotation as the mold sections are opened and wherein said means for rotating the spindle about the spindle axis then rotates the take-out member in an opposite direction to remove the blown article from between the opened mold sections.

33. A rotary blow molding machine comprising:
(a) a base,
(b) a carousel rotatably supported on the base about an axis of revolution,
(c) means for rotating the carousel,
(d) a plurality of mold stations mounted on the carousel in circumferentially spaced apart relation thereon, said mold stations each comprising a pair of mold sections openable and closeable to define, when closed, a blowing cavity in which a parison is blown to form a blown article and a mouth communicating with the blowing cavity and through which the blown article is accessible from outside the closed mold sections, and
(e) a take-out mechanism for removing the blown article from a respective pair of closed mold sections as said pair is indexably rotated therepast, said take-out mechanism comprising a turret arm rotatable in oscillatory manner about the axis of revolution of the carousel, a spindle disposed on the turret arm for rotation about a spindle axis and including a plurality of take-out members thereon, means for rotating the spindle about the spindle axis to a gripping station where a respective one of the take-out members is aligned with the mouth of a respective pair of closed mold sections having a blown article in the blowing cavity thereof, means for moving said respective one of the take-out members into the mouth to grip the blown article from the inside, means for rotatably oscillating the turret arm about the axis of revolution of the carousel in synchronism with rotary indexing of the carousel to cause said spindle and said respective one of the take-out members to follow rotation of said respective pair of closed mold sections from the gripping station as they are opened for eventual removal of the blown article by rotation of the spindle about the spindle axis and then to return the spindle to the gripping station so that another take-out member can be aligned with the mouth of a successive pair of closed mold stations indexed to the gripping station.

34. The machine of claim 33 wherein said means for rotating the spindle rotatably indexes the spindle to remove the blown article from the opened mold sections as the spindle begins its return to the gripping station.

35. The machine of claim 33 wherein each take-out member includes an expandable pin on the end thereof, said pin entering inside the blown article where it is expanded to grip the blown article from the inside.

36. The machine of claim 35 wherein the expandable pin includes a resilient sleeve and a fluid piston to engage and expand the sleeve.

37. The machine of claim 36 wherein the resilient sleeve is made of elastomeric material.

38. The machine of claim 33 wherein the means for rotating the spindle comprises a rack and pinion mechanism actuated by oscillation of the turret arm to rotatably index the spindle in synchronism with rotary indexing of the carousel.

39. The machine of claim 38 wherein the pinion is rotatably disposed in the turret and the rack extends through the turret for movement of the pinion therepast in oscillating manner about the axis of revolution of the carousel as the turret is oscillated.

40. The machine of claim 39 wherein the rack is pivotally mounted on a support to accommodate oscillation of the pinion about the axis of revolution of the carousel.

41. The machine of claim 33 wherein said means for rotatably oscillating the turret arm about the axis of revolution of the carousel initially rotates the said respective one of the take-out members in the same direction as the direction of carousel rotation as the mold sections are opened and wherein said means for rotating the spindle about the spindle axis then rotates said respective one of the take-out members in an opposite direction to remove the blown article from between the opened mold sections.

42. A rotary blow molding machine comprising:
(a) a base,
(b) a carousel rotatably supported on the base about an axis of revolution,
(c) means for rotating the carousel,
(d) a plurality of mold stations mounted on the carousel in circumferentially spaced apart relation thereon, said mold stations each comprising a pair of mold sections openable and closeable to define, when closed, a blowing cavity in which a parison is blown to form a blown article and a mouth communicating with the blowing cavity and through which the blown article is accessible from outside the closed mold sections, and
(e) a take-out mechanism for removing the blown article from a respective pair of closed mold sections as said pair is indexably rotated therepast, said take-out mechanism comprising a turret arm rotatable in oscillatory manner about the axis of revolution of the carousel, a turret carried on the turret arm for oscillatory rotation therewith, a spindle disposed on the turret for rotation about a spindle axis and including a plurality of take-out members thereon, means for rotating the spindle about the spindle axis to a gripping station where a respective one of the take-out members is aligned with the mouth of a respective pair of closed mold sections, means for moving the take-out member into the mouth to grip the blown article from the inside, means for rotatably oscillating the turret arm about the axis of revolution of the carousel in synchronism with rotary indexing of the carousel to cause the spindle to follow rotation of said respective pair of closed mold sections from the gripping station as they are opened for removal of the blown article by rotation of the spindle about the spindle axis and to return the spindle to the gripping station so that another take-out member can be aligned with the mouth of a successive pair of closed mold stations indexed to the gripping station.

43. The machine of claim 42 wherein each take-out member includes an expandible take-out pin.

44. The machine of claim 42 said means for rotatably oscillating the turret arm about the axis of revolution of the carousel initially rotates the said respective one of the take-out members in the same direction as the direction of carousel rotation as the mold sections are opened and wherein said means for rotating the spindle about the spindle axis then rotates said respective one of the take-out members in an opposite direction to remove the blown article from between the opened mold sections.

45. A rotary blown molding machine comprising:
(a) a base,
(b) a carousel rotatably supported on the base about an axis of revolution,
(c) means for indexably rotating the carousel,
(d) a plurality of mold stations mounted on the carousel in circumferentially spaced apart relation thereon, said mold stations each comprising a pair of mold sections openable and closeable for defining, when closed, a blowing cavity in which a parison is blown to form a blown article and a mold mouth communicating with the blowing cavity and through which the blown article is accessible,
(e) means for opening and closing the mold sections of each mold station, and
(f) a take-out mechanism for removing the blown article from a respective pair of mold sections as they are rotated therepast, said take-out mechanism comprising a take-out member for gripping the blown article when said respective pair of mold sections is closed, means for initially rotating the take-out member a limited angular extent about the axis of revolution of the carousel in synchronism with the carousel to cause the take-out member gripping the blown article to track rotation of said mold sections as they are opened sufficiently to permit removal of the blown article from therebetween, and means for rotating the take-out member gripping the blown article between the opened mold sections about another axis of revolution after the initial limited angular rotation to remove the blown article from between the opened mold sections.

46. A rotary blow molding machine comprising:
(a) a base,
(b) a carousel rotatably supported on the base about an axis of revolution,
(c) means for indexably rotating the carousel,
(d) a plurality of mold stations mounted on the carousel in circumferentially spaced apart relation thereon, said mold stations each comprising a pair of mold sections openable and closeable for defining, when closed, a blowing cavity in which a parison is blown to form a blown article and a mold mouth communicating with the blowing cavity and through which the blown article is accessible, and
(e) means for opening and closing the mold sections of each mold station, and
(f) a take-out mechanism for removing the blown article from a respective pair of mold sections as they are rotated therepast, said take-out mechanism comprising a turret arm rotatable in oscillatory manner about the axis of revolution of the carousel, a take-out member on the turret arm for gripping the blown article between said respective pair of closed mold sections, means for rotating the turret arm about the axis of revolution of the carousel in synchronism therewith to cause the take-out member gripping the blown article to initially track rotation of said mold sections as they are opened sufficiently to permit removal of the blown article from therebetween, and means for rotating the take-out member gripping the blown article between the opened mold sections about another axis of revolution after the initial tracking to permit opening of the mold sections to remove the blown article from between the opened mold sections.

* * * * *

UNITED STATES PATENT AND TRADEMARK OFFICE
CERTIFICATE OF CORRECTION

PATENT NO. : 4,902,217

DATED : February 20, 1990

INVENTOR(S) : M. Warren MArtin, Lawrence H. Weber

It is certified that error appears in the above-identified patent and that said Letters Patent is hereby corrected as shown below:

```
Column 4, line 47, after "42c", delete "44b".
Column 5, line 27, after "apparent" insert --.--.
Column 7, line 2, after "second link" insert --182--.
Column 7, line 3, after "and" delete "182".
Column 8, line 29, after "ousel" insert --14--.
Column 8, line 67, after "blow pin" insert --150--.
Column 9, line 1, after "mold mouth" insert --126--.
Column 11, line 26, after "mounted" delete "o" and insert
          --on--.
Column 12, line 5, delete "462a,b,c" and insert therefor
          --463a,b,c--.
Column 12, line 19, delete "502i" and insert therefor
          --502--.
Column 14, line 16, after "outside" insert --of--.
Column 14, line 26, delete "P2" and insert --P5--.
```

UNITED STATES PATENT AND TRADEMARK OFFICE
CERTIFICATE OF CORRECTION

PATENT NO. : 4,902,217
DATED : February 20, 1990
INVENTOR(S) : M. Warren Martin, et. al.

It is certified that error appears in the above-indentified patent and that said Letters Patent is hereby corrected as shown below:

Column 19, line 48, after "42" insert --wherein--.

Signed and Sealed this

Seventeenth Day of August, 1993

Attest:

BRUCE LEHMAN

*Attesting Officer*     *Commissioner of Patents and Trademarks*